(12) United States Patent
Raffaelli

(10) Patent No.: US 12,391,331 B2
(45) Date of Patent: *Aug. 19, 2025

(54) MOTOR VEHICLE WITH A SUSPENSION USING A ROBERTS FOUR-BAR LINKAGE

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 780 days.

This patent is subject to a terminal disclaimer.

(21) Appl. No.: 17/641,323

(22) PCT Filed: Sep. 4, 2020

(86) PCT No.: PCT/IB2020/058236
§ 371 (c)(1),
(2) Date: Mar. 8, 2022

(87) PCT Pub. No.: WO2021/048717
PCT Pub. Date: Mar. 18, 2021

(65) Prior Publication Data
US 2022/0396332 A1    Dec. 15, 2022

(30) Foreign Application Priority Data
Sep. 9, 2019 (IT) .................. 102019000015911

(51) Int. Cl.
*B62K 25/24* (2006.01)
*B62K 21/02* (2006.01)
*B62K 25/00* (2006.01)

(52) U.S. Cl.
CPC .............. *B62K 25/24* (2013.01); *B62K 21/02* (2013.01); *B62K 25/005* (2013.01); *B62K 2201/04* (2013.01)

(58) Field of Classification Search
CPC . B62K 25/24; B62K 5/08; B62K 5/10; B62K 21/02; B62K 2005/001;
(Continued)

(56) References Cited

U.S. PATENT DOCUMENTS

| 8,109,523 | B2 * | 2/2012 | Kolesar | ................... | B62B 13/04 |
| | | | | | 280/14.28 |
| 2003/0102176 | A1 * | 6/2003 | Bautista | ................. | B62K 5/027 |
| | | | | | 280/124.103 |

(Continued)

FOREIGN PATENT DOCUMENTS

| EP | 0001344 A1 | 4/1979 |
| EP | 2595868 A1 | 5/2013 |

(Continued)

*Primary Examiner* — Valentin Neacsu
*Assistant Examiner* — Marlon A Arce
(74) *Attorney, Agent, or Firm* — McGlew and Tuttle, P.C.

(57) ABSTRACT

The saddle-riding motor vehicle (1; 107; 207) comprises a rear driving wheel (5; 105; 205) and a front steered wheel (7; 107; 207). The front steered wheel (7; 107; 207X, 207Y) is connected to a rotatable arm (9; 109; 209X, 209Y) provided with a rotary motion about a steering axis (A-A). A wheel support (37; 137) is connected to the rotatable arm (9; 109; 209) with the interposition of a suspension (17; 117; 217X, 217Y) comprising a shock absorber (22; 122). The suspension (17; 117) comprises a Roberts four-bar linkage.

15 Claims, 19 Drawing Sheets

(58) Field of Classification Search
CPC .. B62K 25/005; B60G 3/207; B60G 2200/44; B60G 2204/422; B60G 2300/122; B60G 2200/13; B60G 2200/143; B60G 2204/12; B60G 15/067; B60G 2204/421; B60G 2300/12

See application file for complete search history.

(56) References Cited

U.S. PATENT DOCUMENTS

| | | | | |
|---|---|---|---|---|
| 2008/0202827 | A1* | 8/2008 | Thiers | B62K 21/005 180/6.24 |
| 2009/0218778 | A1* | 9/2009 | Chen | B62K 25/24 280/124.13 |
| 2011/0012321 | A1* | 1/2011 | Chen | B60G 3/00 280/124.13 |
| 2018/0281888 | A1* | 10/2018 | Chang | B62K 21/04 |
| 2019/0031276 | A1 | 1/2019 | Weagle | |
| 2020/0017158 | A1* | 1/2020 | Hara | B62K 5/08 |
| 2021/0394857 | A1* | 12/2021 | Raffaelli | B62K 5/10 |
| 2022/0339984 | A1* | 10/2022 | Starik | B60G 3/20 |
| 2024/0010295 | A1* | 1/2024 | Raffaelli | B62K 25/24 |
| 2024/0043086 | A1* | 2/2024 | Raffaelli | B62K 5/10 |

FOREIGN PATENT DOCUMENTS

| | | |
|---|---|---|
| EP | 2595868 B1 | 7/2015 |
| JP | 2014193678 A | 10/2014 |
| JP | 2016521228 A | 7/2016 |

* cited by examiner

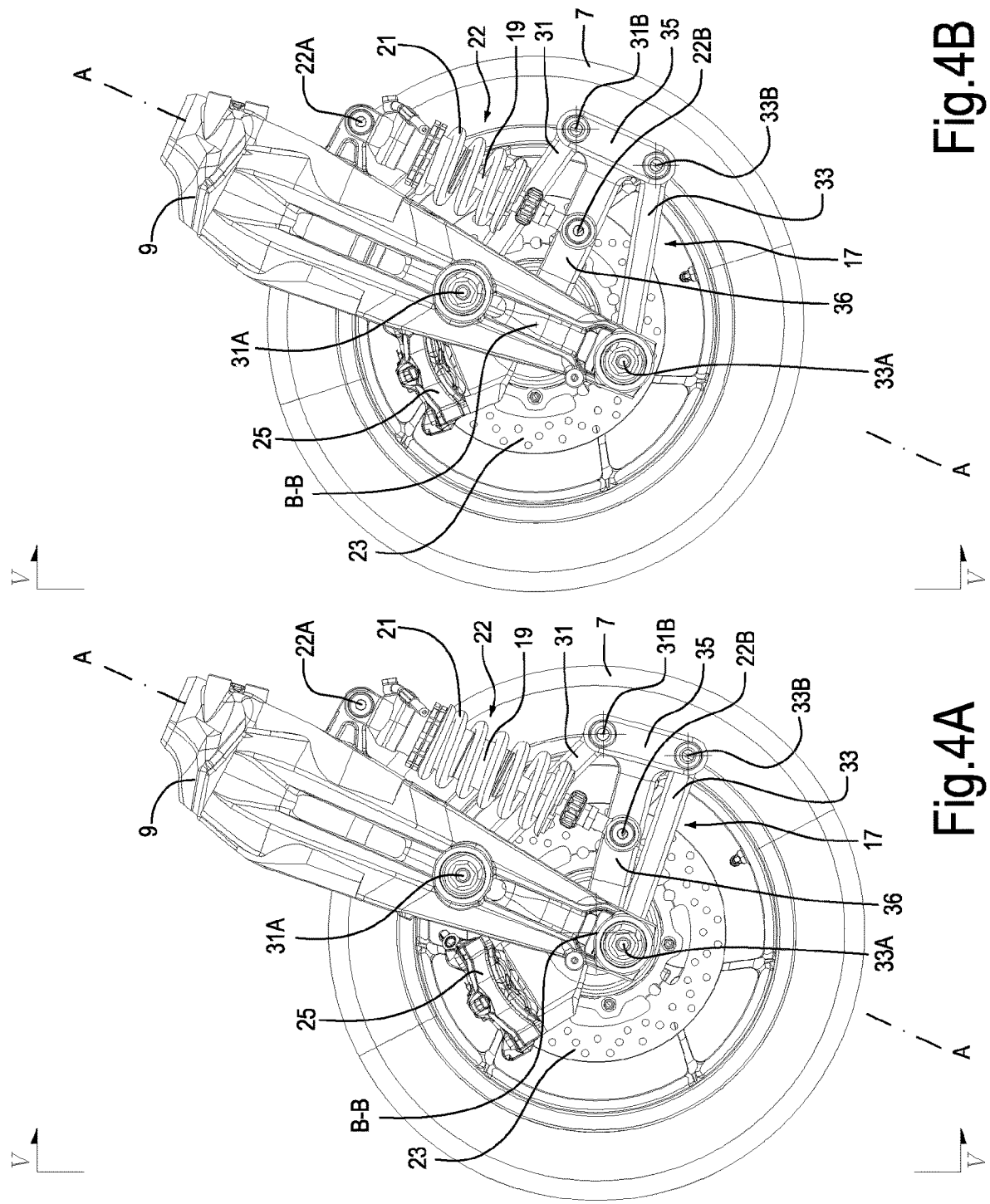

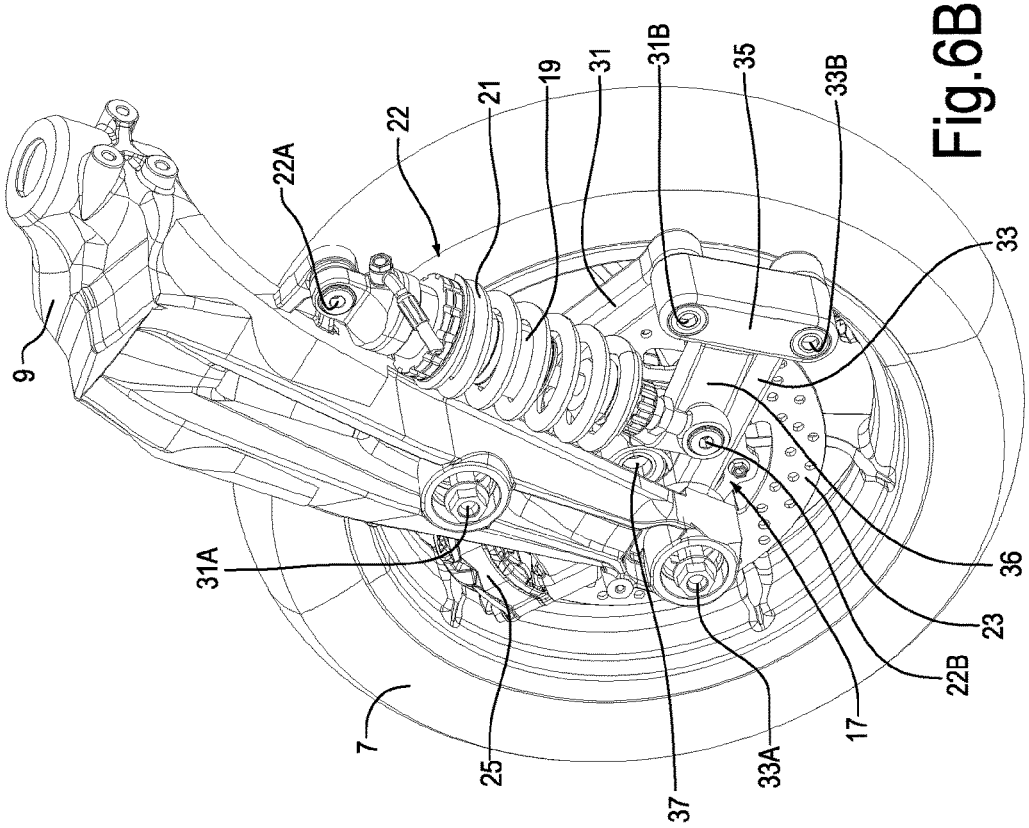
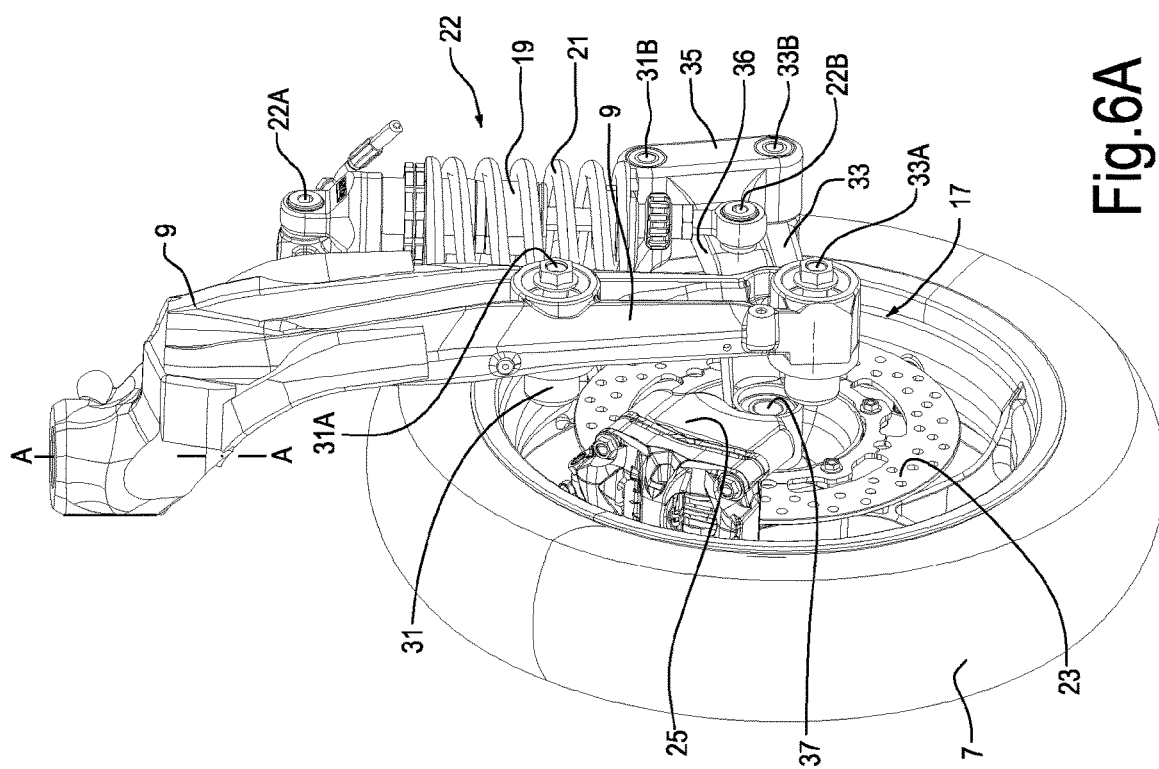

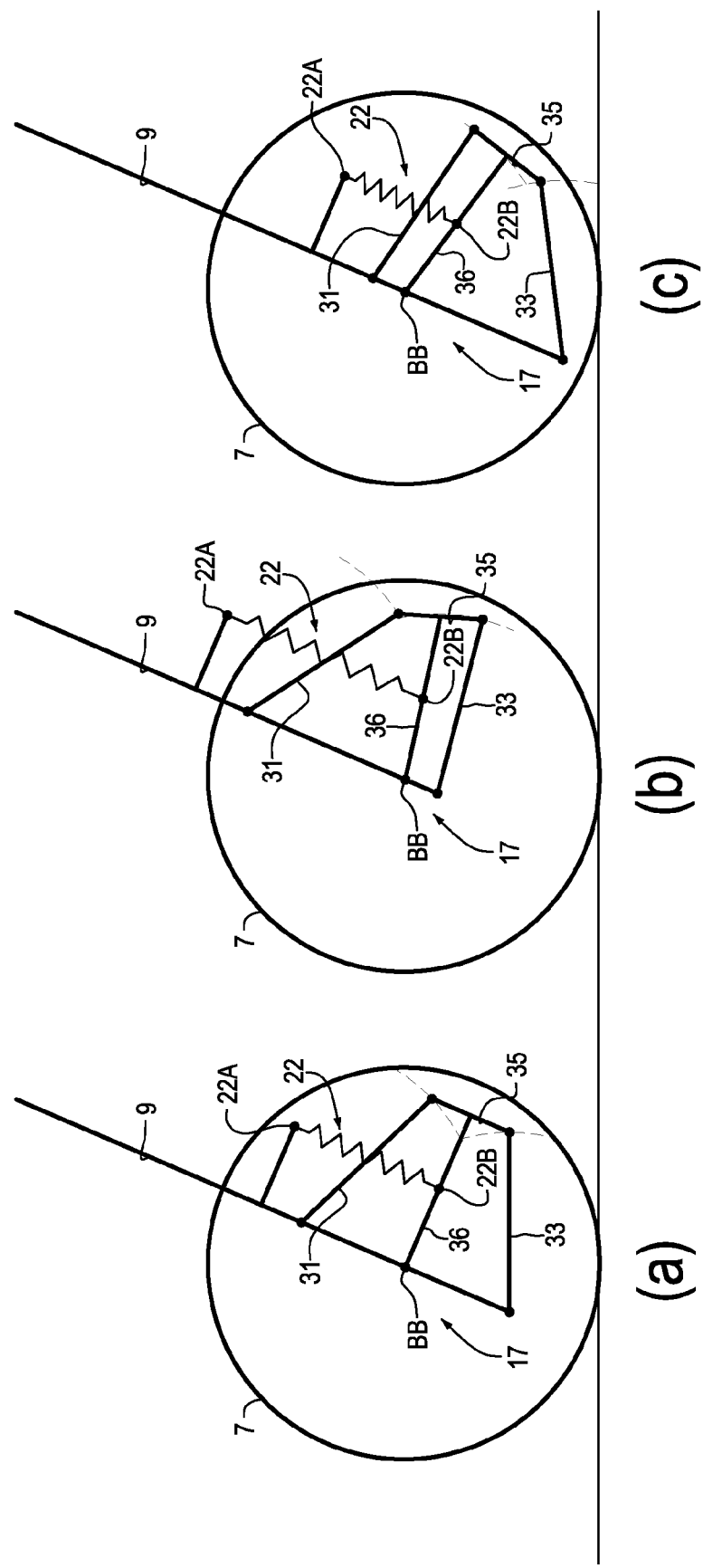

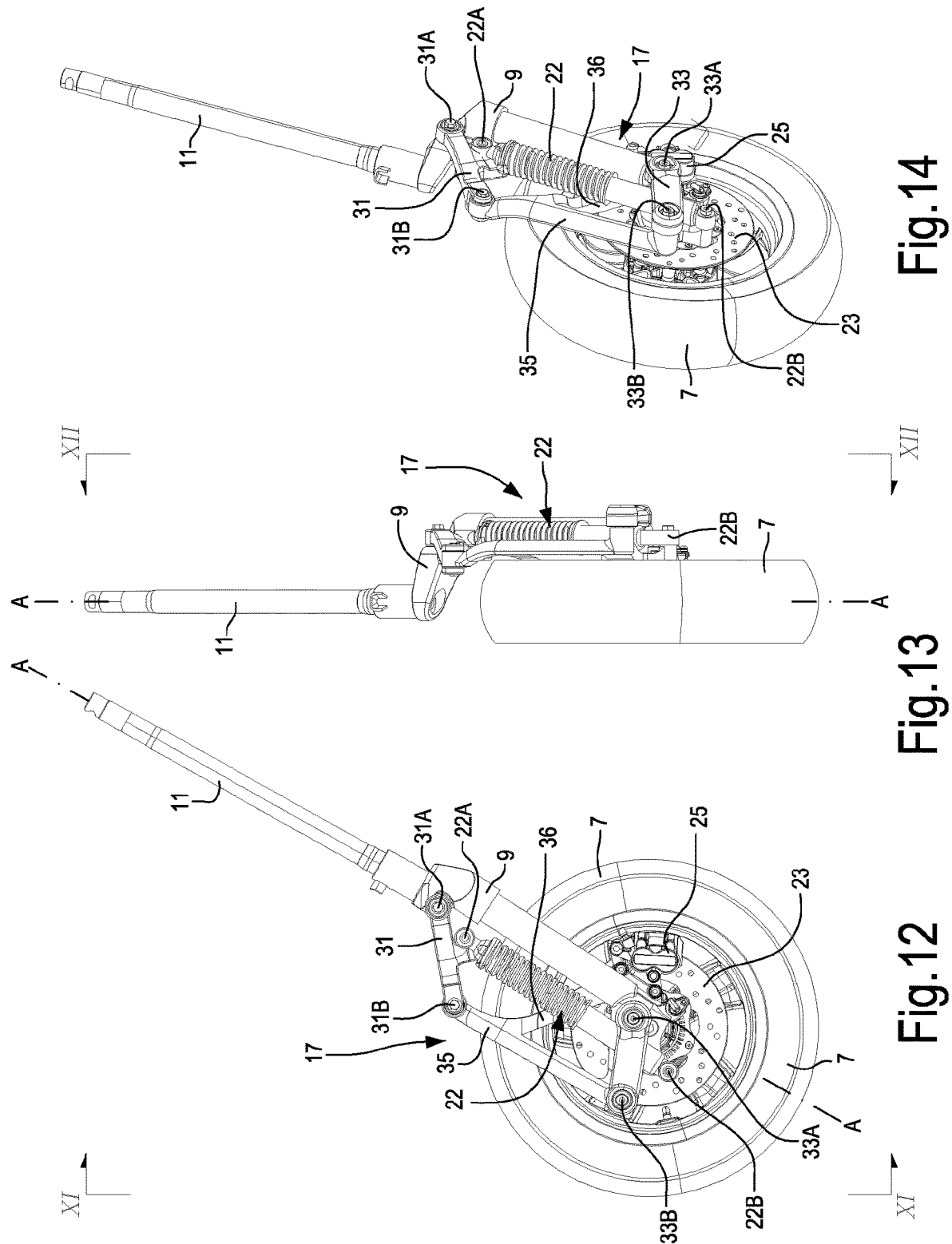

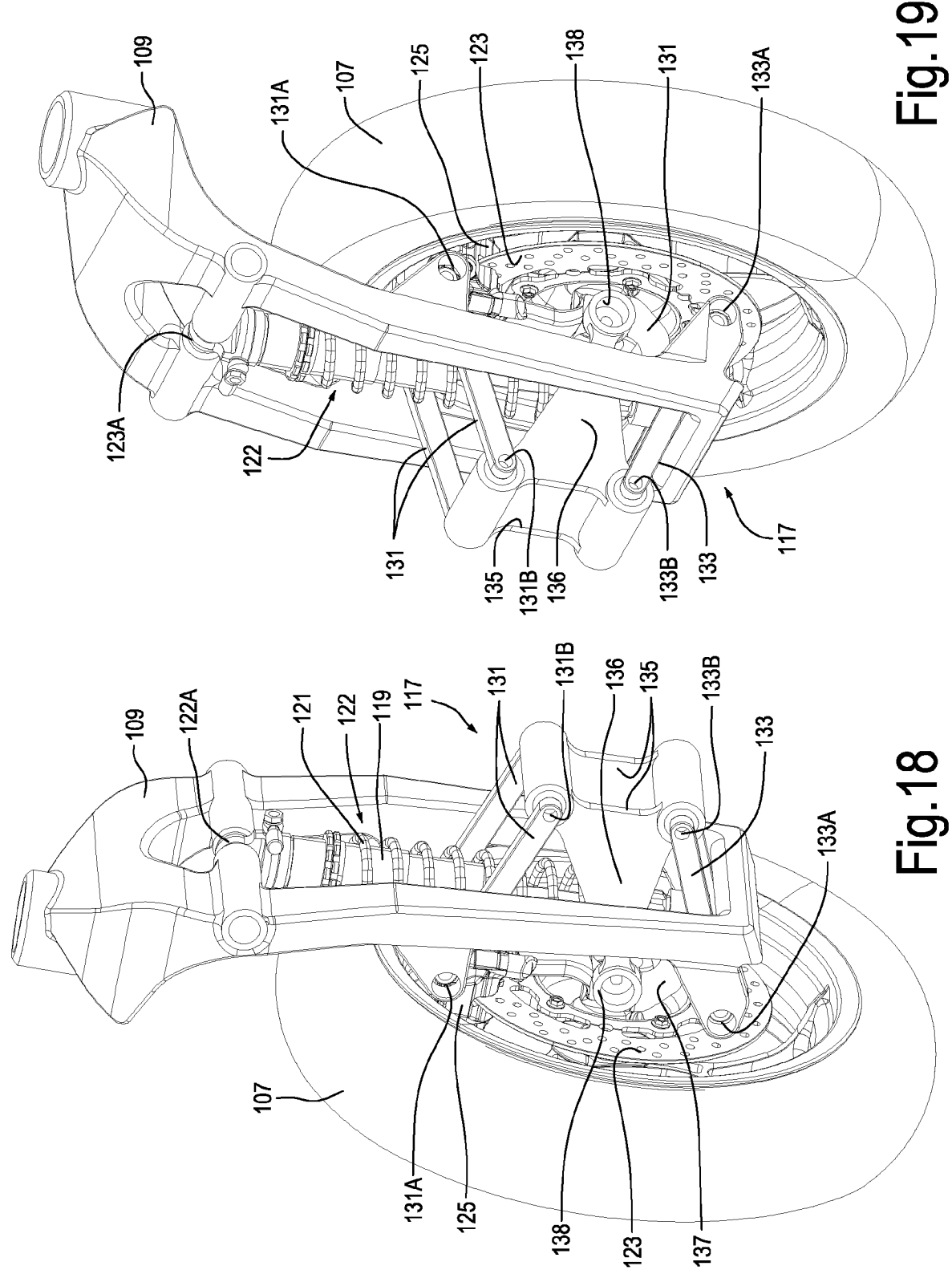

MOTOR VEHICLE WITH A SUSPENSION USING A ROBERTS FOUR-BAR LINKAGE

TECHNICAL FILED

The invention relates to improvements to two-, three- or four-wheel saddle-riding vehicles. More specifically, the invention relates to improvements to the front suspension of a tilting type saddle motor vehicle, with one or two rear driving wheels and one or two front steered wheels, such as for example two- or three-wheel motorcycles, two- or three-wheel scooters, QUAD or the like.

BACKGROUND ART

Two-, three- or four-wheel saddle-riding vehicles typically have one or two rear driving wheels, connected to the frame of the motor vehicle through their own rear suspension, and one or two front steered wheels, connected to a handlebar and provided with respective front suspensions. The suspensions connect the so-called sprung mass to the so-called unsprung mass of the motor vehicle and allow relative movement between suspended and unsprung mass. The suspensions are usually shock absorbing suspensions, and comprise a respective shock absorber, in turn comprising an elastic member, typically a spring, and a brake or damper The suspensions also include mechanical members that connect the sprung mass to the unsprung mass with the possibility of relative movement between them, so that the shocks transmitted by the roughness or irregularity of the ground to the wheels are not transmitted, or are transmitted in a damped manner, to the vehicle chassis.

In saddle-riding vehicles, such as motorcycles, scooters, QUAD or the like, the suspension of the front steered wheels allows relative movement between the handlebar and the steering column on one side and the front steered wheel or wheels on the other. Some suspensions of the front steered wheels of saddle-riding vehicles use telescopic forks with members sliding one inside the other to allow the aforesaid relative movement. The telescopic forks use cylindrical pairs, which have members in mutual sliding relationship; these forks therefore have some typical drawbacks of this type of relative motion. Other types of suspensions, on the other hand, use revolute pairs, which have members in mutual rotation relationship. In this case, quadrilateral four-bar linkage, typically an articulated parallelogram, is interposed between the sprung mass and the unsprung mass, which deforms to allow the suspension movement between the sprung mass (vehicle chassis and members connected thereto) and the unsprung mass (wheel, brakes). The revolute pairs are represented by the hinges that join together the components of the four bar linkage.

Suspensions that use kinematic mechanisms with revolute pairs for the connection between sprung mass and unsprung mass have the advantages of revolute pairs with respect to prismatic and cylindrical pairs, but do not allow a straight movement of the front steered wheel axis. In the suspension movement, in fact, when the suspension contracts and extends due to, for example, an uneven ground, or during braking due to the dynamic forces generated on the frame and which are discharged onto the wheels through the suspension, the wheel axle performs a non-rectilinear movement with consequent transverse sliding movement of the wheel on the ground, which can trigger, for example, problems of skipping.

It would therefore be beneficial to provide a suspension for front steered wheels of saddle-riding motor vehicles, with two or more wheels, which allows combining the advantages of a telescopic fork suspension, with the advantages of suspensions using revolute pair kinematic mechanisms.

SUMMARY OF THE INVENTION

According to one aspect, a saddle-riding motor vehicle is disclosed herein with at least one rear driving wheel and at least a first front steered wheel, which is connected to a rotatable arm provided with a rotary motion about a steering axis. A wheel support is connected to the rotatable arm with the interposition of a suspension which connects the wheel support and the wheel mounted thereon to the rotatable arm. The suspension includes a shock absorber. The wheel support supports the front steered wheel and defines an axis of rotation of said wheel. For example, a wheel mounting axle may be fixed to the wheel support, or the wheel support may have a bearing supporting the wheel axle. Characteristically, the suspension comprises a Roberts four-bar linkage, or Roberts mechanism.

In embodiments described herein, the Roberts four-bar linkage comprises a first crank hinged with a first hinge to the rotatable arm and with a second hinge to a connecting rod of the Roberts four-bar linkage. The Roberts four-bar linkage further comprises a second crank hinged with a first hinge to the rotatable arm and with a second hinge to the connecting rod. The wheel support is constrained in a constraining point of an appendix of the connecting rod, which extends between the first crank and the second crank and remains between the first crank and the second crank during a suspension movement of the suspension.

In some embodiments disclosed herein, the wheel support is constrained to the connecting rod of the Roberts four-bar linkage, and more particularly to its connecting rod, so that the rotation axis of the front steered wheel is parallel to the axes of the first hinge and of the second hinge of the first crank and of the second crank.

In embodiments of this type, the first crank and the second crank may extend from the respective first hinges, and therefore from the rotatable arm, in a direction towards the rear of the motor vehicle, so that the connecting rod is behind the rotatable arm with respect to the forward direction of the motor vehicle. The appendix of the connecting rod extends from a proximal end, integral with the main body of the connecting rod, towards a distal end, from the main body of the connecting rod forward towards the rotatable arm. The main body of the connecting rod forms the respective second hinges for constraining the first crank and the second crank.

The wheel support may be rigidly connected to the appendix of the connecting rod of the Roberts four-bar linkage to form a seat for a front steered wheel support bearing. The seat may be formed by an annular seat, in which the bearing is inserted, inside which a rotation axle of the front steered wheel is in turn supported. In other embodiments, the seat may consist of an axle rigidly fixed to the wheel support, and on which the support bearing of the front steered wheel is mounted.

In some embodiments, the axes of the hinges of the Roberts four-bar linkage are parallel to the rotation axis of the front steered wheel. In this case, the movable elements of the Roberts four-bar linkage move parallel to a plane orthogonal to the rotation axis of the front steered wheel.

In other embodiments, the axes of the hinges of the Roberts four-bar linkage are parallel to each other and orthogonal to a plane containing the rotation axis of the front steered wheel. In this case, the movable elements of the Roberts four-bar linkage move parallel to a plane containing the rotation axis of the front steered wheel and oriented in the right-left direction of the motor vehicle.

In this case, the first hinges with which the cranks of Roberts four-bar linkage are connected to the rotatable arm may be positioned on one side of the rotatable arm, for example on the side facing the front steered wheel. Conversely, the second hinges, with which the cranks of the Roberts four-bar linkage are connected to the connecting rod may be placed on the opposite side of the rotatable arm, for example on the opposite side with respect to the front steered wheel. The appendix of the connecting rod extends from one side of the rotatable arm to the other.

In the embodiments disclosed herein, the wheel support is hinged to the appendix of the connecting rod about an axis substantially parallel to the axes of the first hinge and the second hinge of the first crank and the second crank.

The wheel support may support the front steered wheel in a position such that the rotation axis of the front steered wheel is orthogonal to the axis around which the wheel support is hinged to the connecting rod.

The suspension shock absorber may generally be connected between two points of the suspension, which move relative to each other due to the suspension movement of the suspension. For example, the shock absorber may be connected on one side to the rotatable arm and on the other to the first crank, or to the second crank, or to the connecting rod of the Roberts four-bar linkage.

According to another aspect, a saddle-riding motor vehicle is provided with at least one rear driving wheel and at least a first front steered wheel, which is connected by means of a suspension to a rotatable arm provided with a rotary motion about a steering axis, wherein:

a wheel support is connected to the rotatable arm with the interposition of the suspension, which supports the front steered wheel and defines the rotation axis of said wheel;

the suspension comprises: a four-bar linkage having: a first crank with a first end hinged to the rotatable arm and a second end hinged to a connecting rod; a second crank with a first end hinged to the rotatable arm and a second end hinged to the connecting rod;

the wheel support is constrained to a connecting rod constraining point; and the four-bar linkage is configured in such a way that during the deformation of the four-bar linkage by effect of the suspension movement of the suspension, the constraining point performs an approximately rectilinear trajectory.

BRIEF DESCRIPTION OF THE DRAWINGS

The invention will be better understood by following the description and the accompanying drawings, which illustrate exemplifying and non-limiting embodiments of the invention. More particularly, in the drawing:

FIGS. 4 and 4B show an enlarged side view of the suspension of FIGS. 1 to 3 in an extended position and in a contracted position, respectively;

FIGS. 6A and 6B show two axonometric views of the suspension of FIGS. 1 to 5;

FIG. 6C shows a summary diagram of the operation of the suspension with Roberts four-bar linkage according to FIGS. 1 to 6B;

FIGS. 12, 13 and 14 show views similar to FIGS. 9, 10 and 11, with parts removed;

FIGS. 18 and 19 show axonometric views according to different angles of the suspension and of the relative front steered wheel in the embodiment of FIGS. 16 and 17;

DETAILED DESCRIPTION OF EMBODIMENTS

FIGS. 1, 2, 3, 4A, 4B, 4C, 5, 6A, 6B and 6C illustrate a two-wheel motor vehicle with a Roberts four-bar linkage suspension, i.e. comprising a Roberts mechanism, in a first embodiment thereof.

Figure 1:
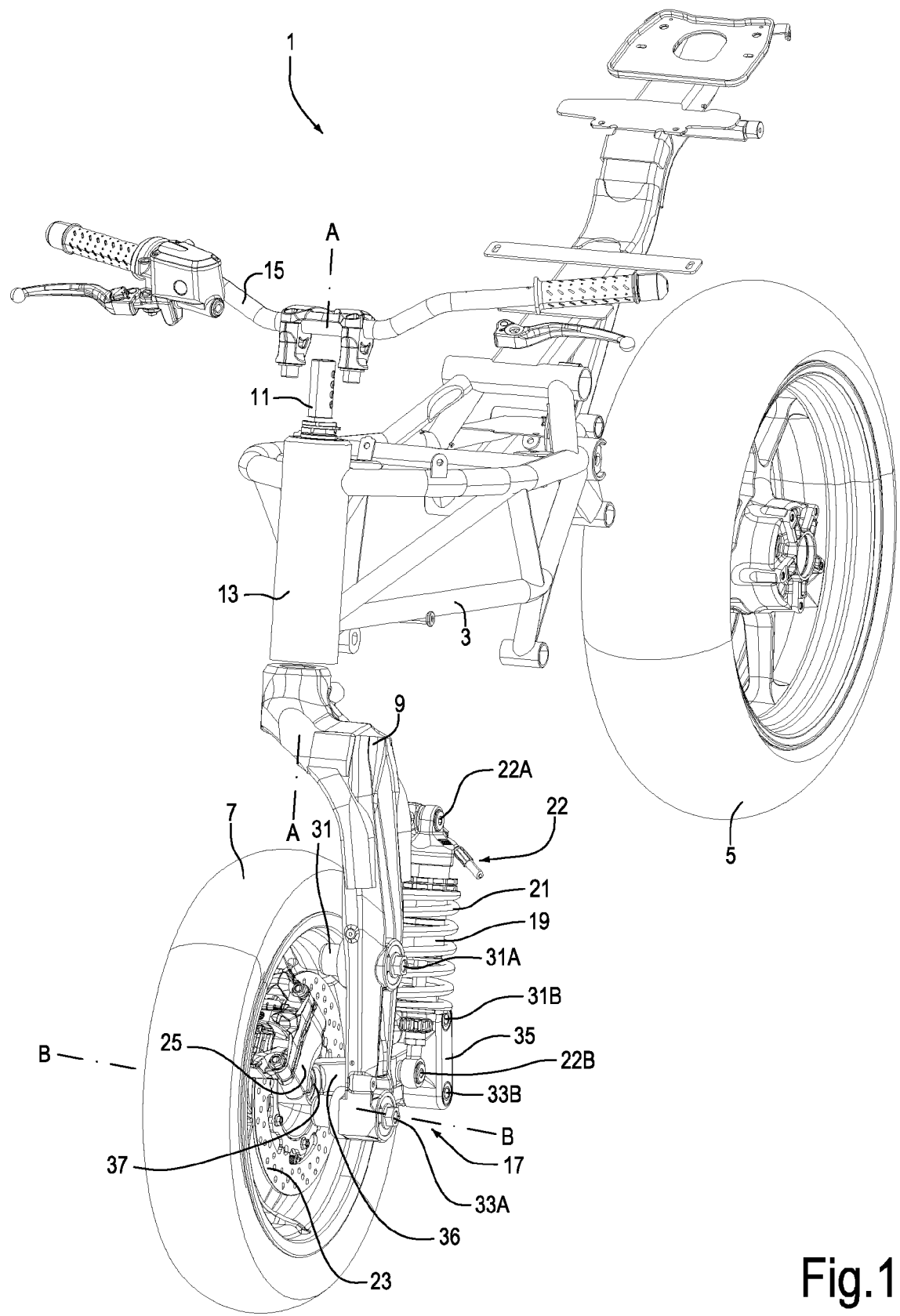
FIG. 1 shows an axonometric view with parts removed of a two-wheel motor vehicle with a front suspension according to an embodiment.
Figure 2:
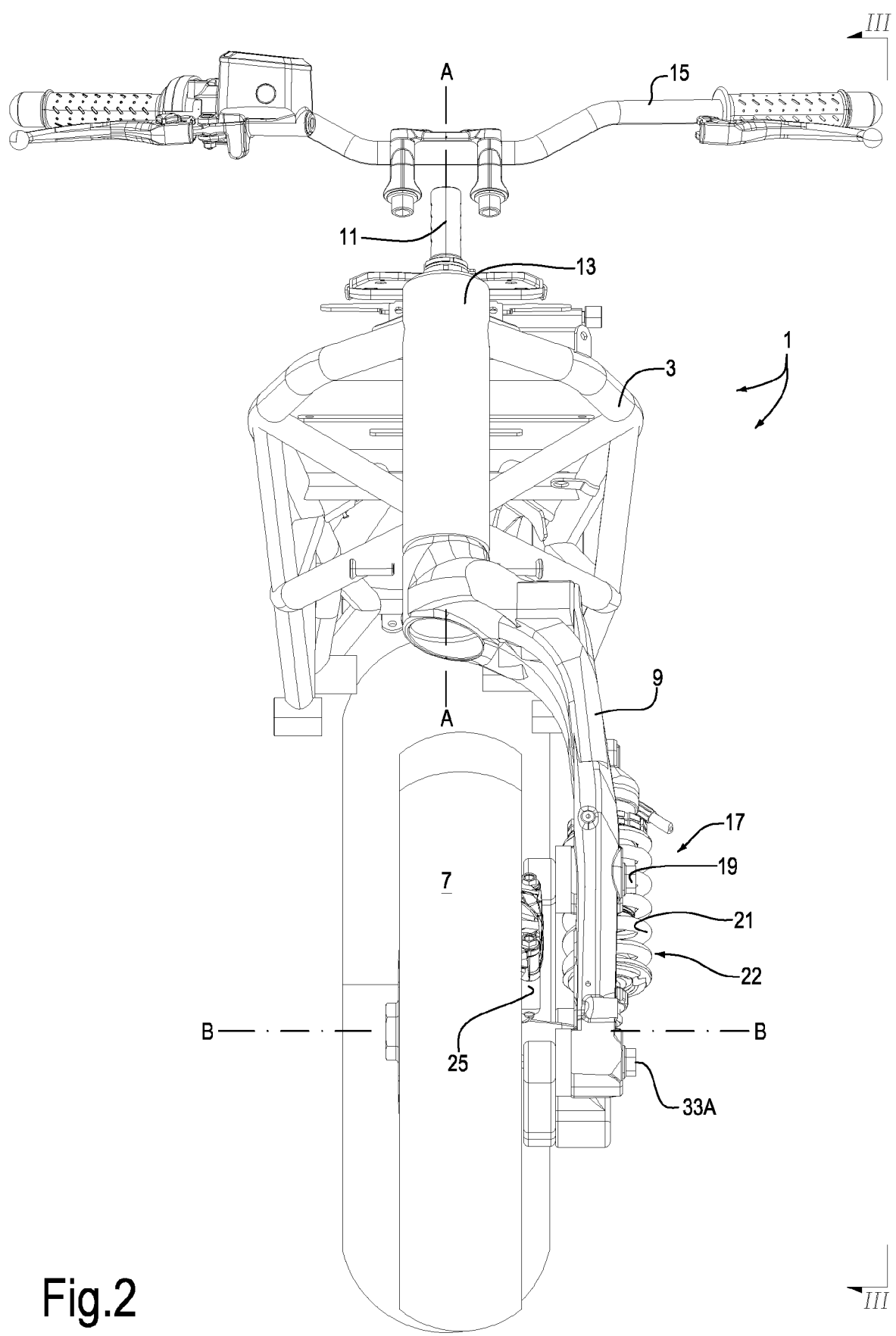
FIG. 2 shows a front view of the motor vehicle of FIG. 1, according to the line II-II of FIG. 3
Figure 3:
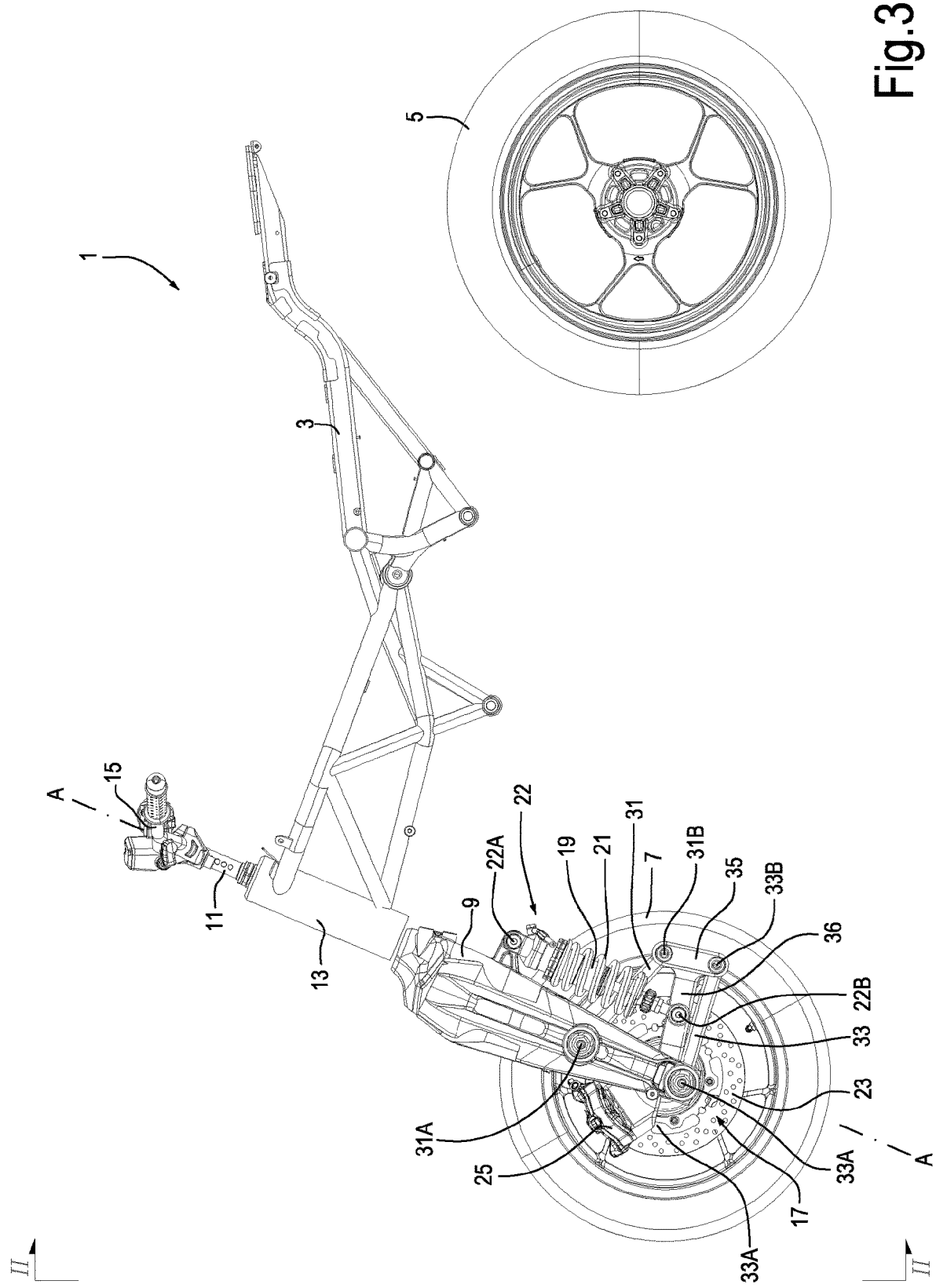
FIG. 3 shows a side view according to III-III of FIG. 2.

The motor vehicle 1 is briefly illustrated in FIGS. 1, 2 and 3. In these views, parts of the motor vehicle, not necessary for understanding the structure and operation of the suspension, are removed or omitted. The motor vehicle 1 comprises a frame 3, a rear driving wheel 5 and a front steered wheel 7. The wheels 5 and 7 are connected to the frame 3 by means of suspensions. The rear suspension, which connects the driving wheel 5 to the frame, is not illustrated and may be configured in any known manner. The front suspension, which connects the front steered wheel 7 to the frame 3, will be described in detail below.

The front steered wheel 7 is connected to a rotatable arm 9. The latter is rigidly connected to a steering column 11 rotatably housed in a steering tube 13 and operable by means of a handlebar 15 to rotate around a steering axis A-A. The rotation of the rotatable arm 9 about the axis A-A allows steering of the vehicle 1.

The front steered wheel 7 is connected to the rotatable arm 9 by means of a suspension generically indicated with 17, which allows the suspension movement of the frame 3, including the steering tube 13, as well as the steering column 11, the handlebar 15 and the rotatable arm 9 with respect to the front steered wheel 7. The suspension 17 is shock absorbing suspension, comprising: a linkage mechanism between the front steered wheel 7 and the rotatable arm 9; and a shock absorber. The latter in turn comprises an elastic element and a brake or damper. In the illustrated embodiment, the shock absorber is indicated with 22, the elastic element with 21 and the brake or damper with 19. The latter is housed coaxially inside the elastic element 21, in the form of a helical spring.

The front steered wheel 7 is supported by the suspension 17 so as to rotate about its own rotation axis B-B.

Reference numeral 23 indicates a disk of a front brake of the motor vehicle 1. The brake further comprises a caliper 25 which may be supported by the suspension 17 in the manner described below.

The suspension 17 comprises components connected to each other by means of revolute pairs, i.e. components that move relative to each other according to a single degree of freedom, represented by a rotation movement about a respective hinge axis. The suspension is therefore free of elements provided with a reciprocal translation movement.

Advantageously, the kinematic system with revolute pairs which connects the front steered wheel 7 to the rotatable arm 9 comprises a so-called Roberts four-bar linkage, or Roberts mechanism. The latter comprises, in addition to the rotatable arm 9, a first crank 31 and a second crank 33. The two cranks 31 and 33 are hinged to the rotatable arm 9 and to a connecting rod 35, which is also part of the Roberts four-bar linkage.

More specifically, the first crank 31 is hinged via a first hinge 31A to the rotatable arm 9 and through a second hinge 31B to the connecting rod 35. In turn, the second crank 33 is hinged through a first hinge 33A to the rotatable arm 9 and through a second hinge 33B to the connecting rod 35. The hinges 31A, 31B, 33A, 33B constitute the revolute pairs of the Roberts four-bar linkage.

The cranks 31 and 33 are of approximately equal length and longer than the connecting rod 35. The length of the components 31, 33, 35 is intended as the distance between the axes of the respective hinges. Therefore, for example, the length of the first crank 31 is given by the distance between the axes of the hinges 31A and 31B, the length of the second crank 33 is given by the distance between the axes of the hinges 33A and 33B, and the length of the connecting rod 35 is given by the distance between the axes of the hinges 31B and 33B.

The connecting rod 35 has an appendix 36, which extends orthogonally to the main body of the connecting rod 35, in an intermediate and approximately central position with respect to the hinges 31B and 33B, so that the connecting rod 35 with its own appendix 36 takes on a T-shape. The appendix has a substantially greater length than the main body of the connecting rod 35 (intended as the distance between the hinges 31B, 33B) from which it extends and is arranged between the two cranks 31, 33, as visible in particular in FIGS. 4A and 4B.

Figure 4C:
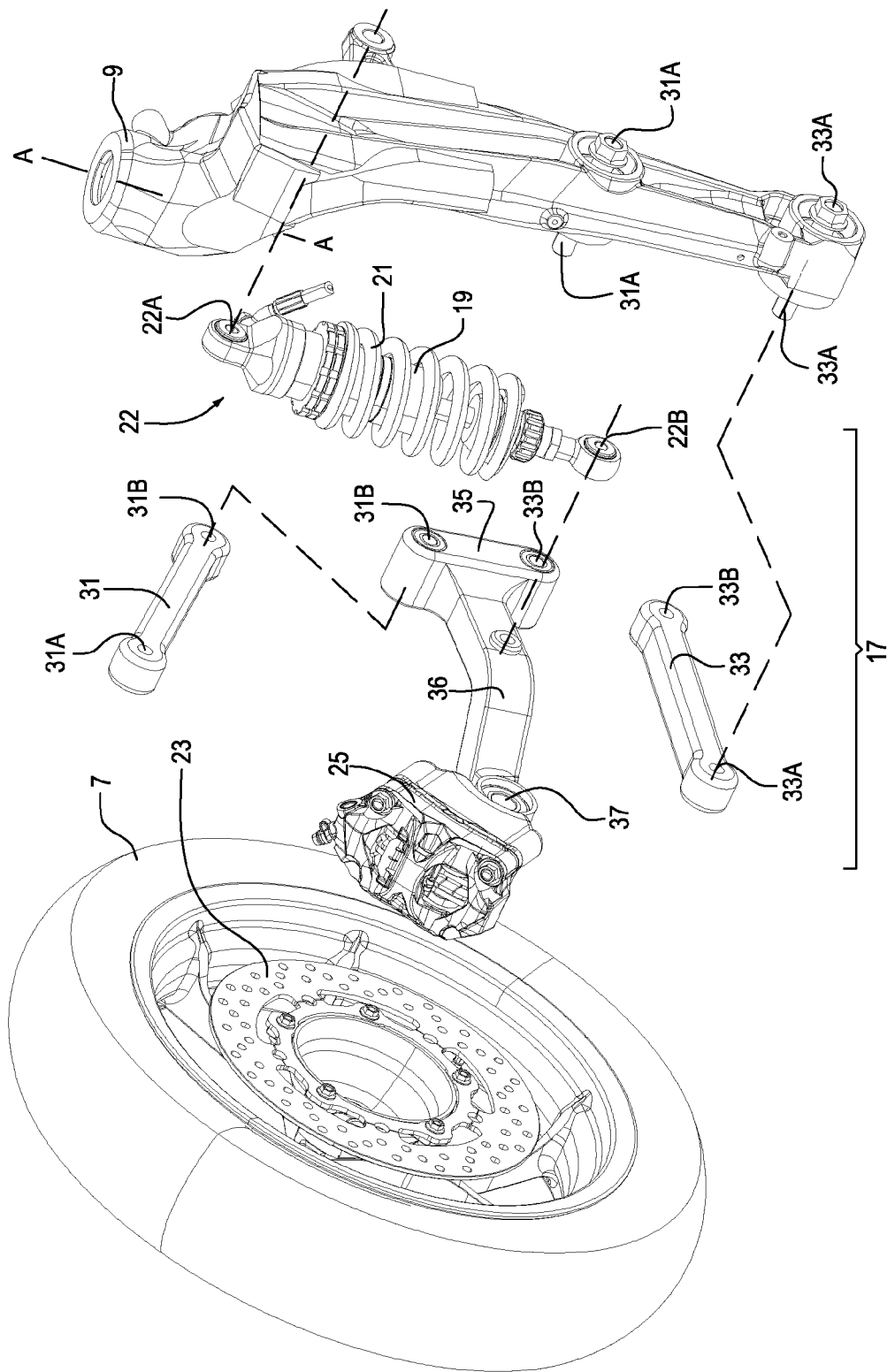
FIG. 4C shows an exploded view of the suspension of FIGS. 1, 2, 3, 4A, 4B.
Figure 5:
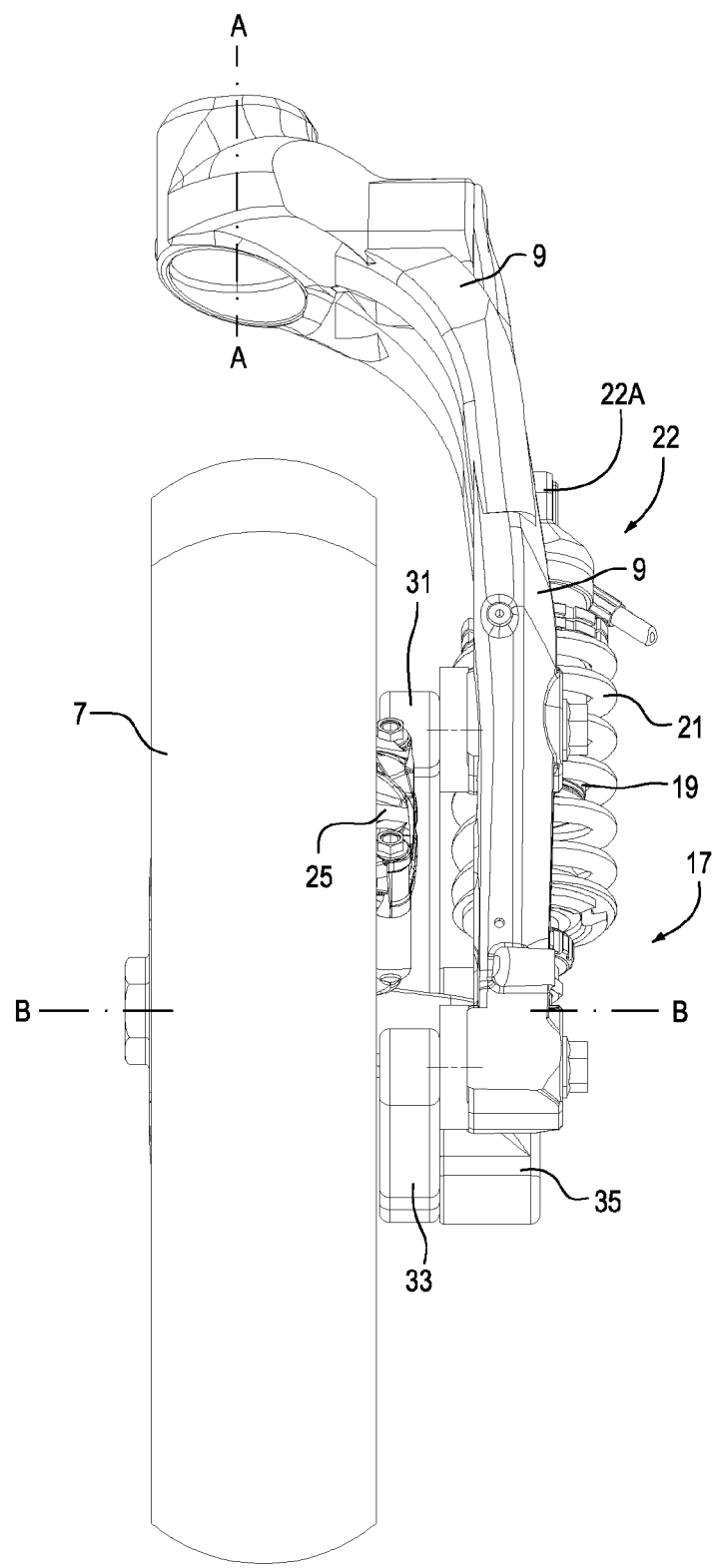
FIG. 5 shows a front view according to the line V-V of FIGS. 4A and 4B.

As visible in particular from the exploded view of FIG. 4C, in the illustrated embodiment, the appendix 36 is not rectilinear, but has a curved shape and its distal end, that is, the end opposite to the body of the connecting rod 35 from which it extends, is facing upwards.

The appendix 36 of the connecting rod 35 defines a connection between the connecting rod 35 and the front steered wheel 7. More particularly, in the illustrated embodiment, the appendix 36 forms a seat for a support bearing of an axle integral with the front steered wheel 7, or an axle on which the front steered wheel 7 can be idly supported. In general, the appendix 36 forms a wheel support 37, which in the illustrated example comprises a seat for a support bearing of the front steered wheel 7. In practice, the wheel support 37 defines the rotation axis B-B of the front steered wheel and maintains said axis in an intermediate position between the axes of the hinges 31A and 33A, and therefore between the cranks 31, 33, as well as orthogonal to the connecting rod 35.

In embodiments, the length of the cranks 31, 33 and of the appendix 36 of the connecting rod 35 are such that the distance between the hinge 31B and the rotation axis B-B of the front steered wheel 7 supported by the appendix 36 is equal to the distance between the hinge 33B and the axis B-B, and such a distance is equal to the length of the cranks 31 and 33. Furthermore, the distance between the hinges 31A and 33A is equal to twice the distance between the hinges 31B and 33B.

In the embodiment of FIGS. 1 to 6B, the caliper 25 of the disc brake 23, 25 is rigidly fixed to the wheel support 37, as can be seen in particular in the exploded view of FIG. 4C.

In the embodiment of FIGS. 1 to 6B, the shock absorber 22 is hinged to the connecting rod 35. More particularly, the shock absorber 22 is hinged at one end in 22A to the rotatable arm 9 and at one end 22B to the appendix 36 of the connecting rod 35. The constraints between the shock absorber 22 and the rotatable arm 9 on one side as well as between the shock absorber and the appendix 36 of the connecting rod 35 on the other may consist of spherical hinges.

As can be easily understood from FIGS. 4A, 4B, which show an extended position and a contracted position of the suspension 17 and the shock absorber 22, the suspension movement of the front steered wheel 7 is allowed by a deformation movement of the Roberts four-bar linkage and more particularly by a pivoting movement of the cranks 31, 33 about the axes 31A, 33A, through which the cranks are hinged to the rotatable arm 9, such a pivoting movement corresponding to a roto-translation movement of the connecting rod 35 and of compression/extension of the shock absorber 22.

Due to the properties of the Roberts four-bar linkage, at least within a certain angle of pivoting motion of the cranks 31, 33 the center of the wheel support 37, which is located on the appendix 36 of the connecting rod 35 and which coincides with the rotation axis B-B of the front steered wheel 7, moves along a substantially rectilinear trajectory. The elements forming the Roberts four-bar linkage are mounted in such a way that the trajectory of the rotation axis B-B of the front steered wheel 7 is approximately rectilinear for the entire stroke from the position of maximum extension to the position of maximum contraction of the suspension 17. A suspension is thus obtained without sliding parts, but only with revolute pairs, wherein the axis of the front steered wheel moves with a substantially rectilinear motion during the suspension movement of the suspension.

FIG. 6C shows this property schematically, with reference to a schematization of the suspension 17. Equal numbers indicate schematic elements which correspond to the suspension components of FIGS. 1 to 6B. The diagram of FIG. 6C shows three different positions of the suspension: halfway, in position (a); fully extended, in position (b) and completely compressed, in position (c).

In the present context, the term "about rectilinear", "substantially rectilinear" or "approximately rectilinear" means a trajectory which deviates from a perfectly rectilinear trajectory by an extent of less than 2 mm and preferably less than 1 mm in the range of use of the suspension, i.e. in any position assumed by the Roberts four-bar linkage during normal use of the motor vehicle.

The embodiment described with reference to FIGS. 1 to 6B may be susceptible of multiple variations. For example, the end 22B of the shock absorber 22 may be connected to one of the two cranks 31, 33, instead of to the connecting rod 35.

As previously described, and as visible in particular in FIG. 4C, the caliper 25 of the disc brake 23, 25 may be rigidly constrained to the connecting rod 35 and more precisely to the appendix 36 thereof. In this case, the caliper 25 rotates integrally with the connecting rod 35 and its appendix 36, about the rotation axis B-B of the front steered wheel 7. This may have a non-negligible pro-dive or anti-dive effect, due to the fact that the instant rotation center of the connecting rod 35 is located close to the point of contact of the front steered wheel 7 with the ground. This instant rotation center is defined by the intersection of the extension of the two rectilinear segments which connect the hinges 31A, 31B and 33A, 33B, respectively. This pro-dive or anti-dive effect may be undesirable In order to avoid or reduce the pro-dive or anti-dive effect of the suspension during braking, in some embodiments it may be provided that the caliper 25 is rigidly connected to a member which is mounted coaxial to the front steered wheel 7, and therefore to the connecting rod 35, but not integral with the latter, and whose instant rotation center is more distant.

Figure 7:
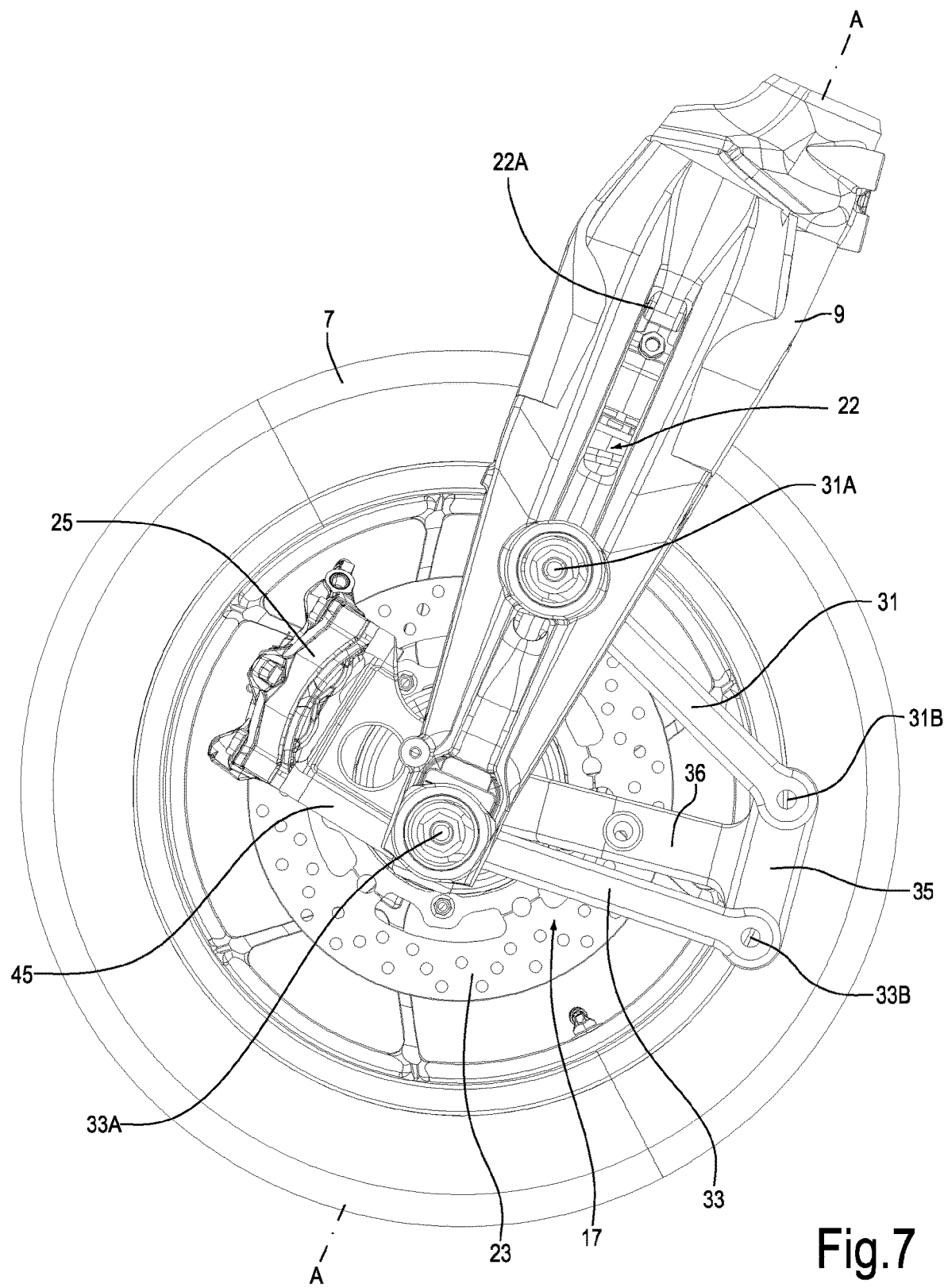
FIG. 7 shows a side view, similar to FIG. 4A, of a further embodiment of a front suspension.
Figure 8:
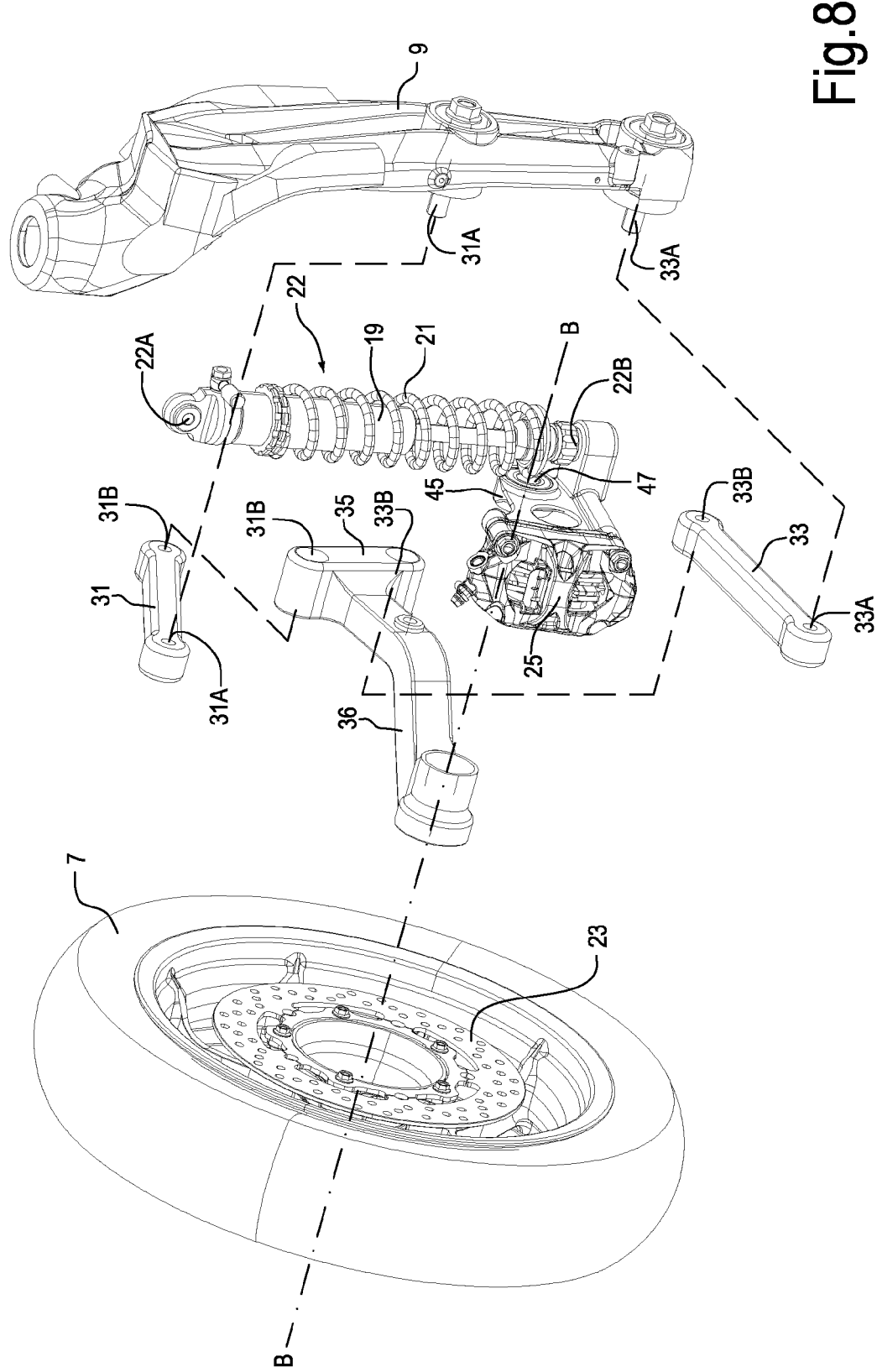
FIG. 8 shows an exploded view of the suspension of FIG. 7.

An embodiment of this type is shown in FIGS. 7 and 8, in which equal numbers indicate parts equal or equivalent to those already described with reference to FIGS. 1 to 6B, and which will not be described again. The exploded view of FIG. 8 shows in particular the support element of the caliper 25 of the disc brake. The support member is indicated with 45. It may have a hole in which a bearing 47 is housed in which the axle of the front steered wheel 7 is inserted, or an extension of such an axle. The distal end of the appendix 36 of the connecting rod 35 is also hinged at the bearing 47.

The member 45 may be rigidly connected to one end 22B of the shock absorber 22 (see in particular FIG. 8). The interlocking constraint between the shock absorber 22 and the member 45 retains the caliper 25 against rotation around the axis B-B during braking. Since the connecting rod 35 and the support member 45 of the caliper 25 are idle with respect to each other, the connecting rod 35 and the member 45 can freely rotate with respect to each other around the rotation axis B-B. The pro-dive or anti-dive effect is very limited or negligible, since the member to which the caliper is rigidly connected in this case consists of the shock absorber 22, whose instant rotation center is placed very far, almost at the infinity.

The suspensions described above can be used in saddle-riding motor vehicles in the form of motorcycles, as schematically illustrated in FIGS. 1, 2 and 3, but can also adapt to use on other types of saddle-riding motor vehicles. FIGS. 9 to 15 illustrate, by way of example, a front end of a scooter, which has a Roberts four-bar linkage suspension for the front steered wheel 7, configured as described above. In FIGS. 9 to 15, equal numbers indicate parts equal or equivalent to those described with reference to FIGS. 1 to 8.

Figure 11:
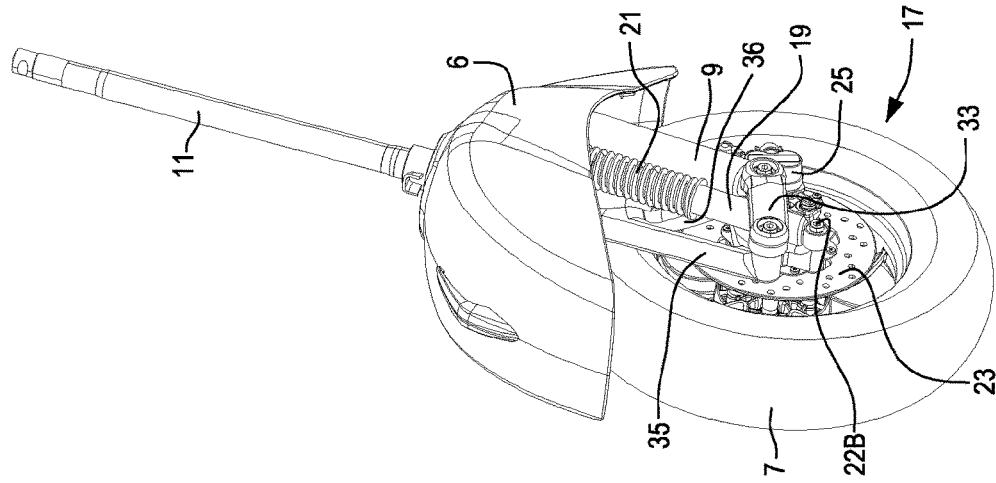
FIG. 11 shows an axonometric view of the front steered wheel and relative suspension of FIGS. 9 and 10 in an axonometric view.
Figure 10:
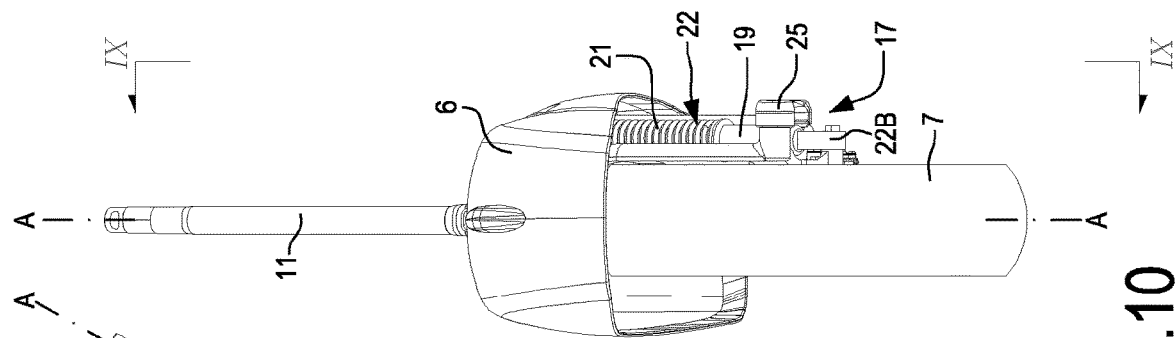
FIG. 10 shows a front view according to line X-X of FIG. 9.
Figure 9:
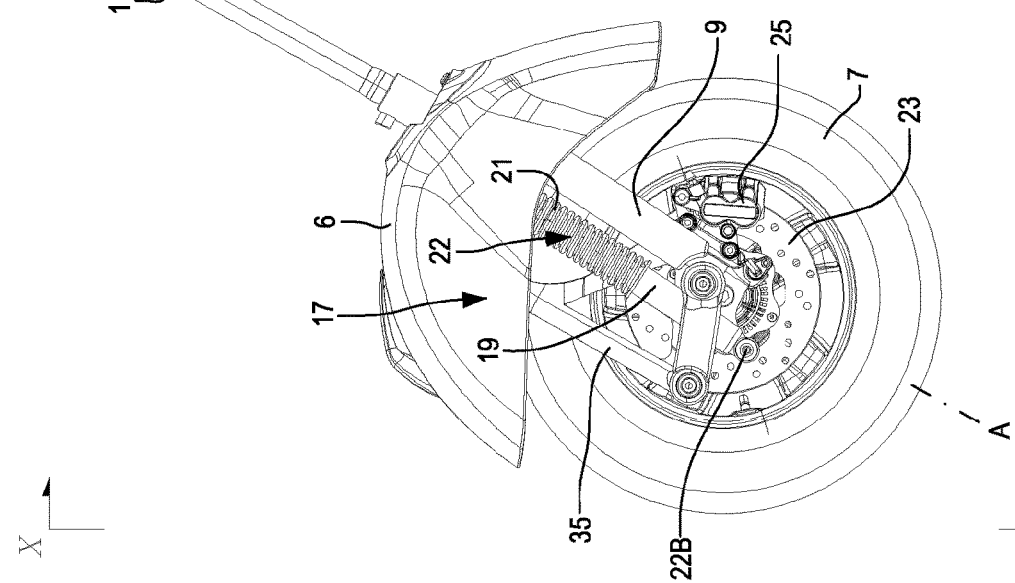
FIG. 9 shows a side view, according to line IX-XI of FIG. 10, of a front steered wheel and relative steering column, with a suspension according to an embodiment, configured for use on a motor vehicle in the form of a scooter.
Figure 15:
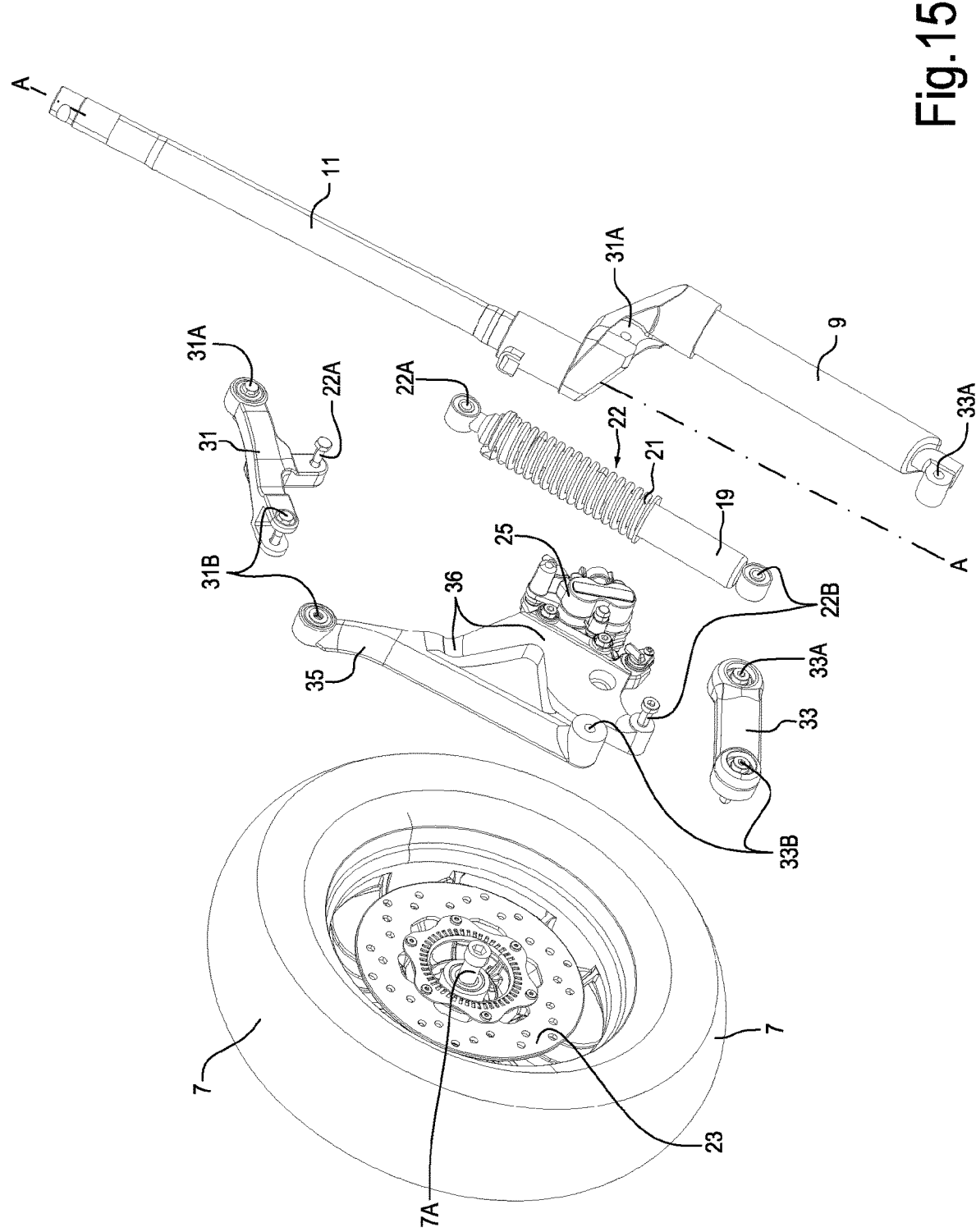
FIG. 15 shows an exploded view of the suspension and of the front steered wheel in the embodiment of FIGS. 9 to 14.

FIGS. 9, 10 and 11 show the front end complete with front mudguard 6, omitted in FIGS. 12, 13 and 14. FIG. 15 shows the front steered wheel 7 with the components of the suspension 17 in an exploded view.

The Roberts four-bar linkage further comprises, in this case, a first and a second crank 31, 33, hinged to the rotatable arm 9 at hinges 31A and 31B. The Roberts four-bar linkage further comprises a connecting rod 35 hinged in 31B and 33B to the cranks 31, 33. The connecting rod 35 comprises an appendix 36 to which the disc brake caliper is integral, the disc whereof is indicated with 23.

The appendix 36 of the connecting rod 35 forms a seat 37 for the axle 7A (FIG. 15) of the front steered wheel 7.

In the illustrated embodiment, the shock absorber 22 is fixed at the top in 22A to the crank 31 and at the bottom in 22B to the appendix 36 of the connecting rod 35. As already mentioned with reference to the embodiments described above, it is not excluded that the shock absorber 22 is fixed to two different points of the suspension 17, movable with respect to each other in the suspension movement, for example to the rotatable arm 9 and to one of the elements 31, 33, 35, or to the connecting rod 35 and to the crank 33.

As can be seen in the drawing, the arrangement of the cranks 31, 33 and of the connecting rod 35 with respect to the rotatable arm 9 is different in the case of FIGS. 1 to 8 with respect to FIGS. 9 to 15. In the first embodiments, the Roberts four-bar linkage extends from the rotatable arm 9 backwards, while in the embodiment of FIGS. 9 to 15 it extends forward and is located in front of the steering axis A-A.

In all the embodiments illustrated in FIGS. 1 to 15, the hinges connecting the cranks 31, 33 to the connecting rod 35 and to the rotatable arm 9 are arranged with their hinge axes parallel to each other and parallel to the rotation axis B-B of the front steered wheel 7. In this way, in essence, the Roberts four-bar linkage formed by components 9, 31, 33, 35-36 lies on a plane orthogonal to the rotation axis B-B of the front steered wheel 7. The rotation axes of the revolute pairs of the Roberts four-bar linkage are therefore oriented in a right-left direction, i.e. transverse with respect to a median plane of the motor vehicle 1.

Although this gives rise to a particularly efficient suspension, it is not the only possible embodiment of a Roberts four-bar linkage suspension which allows obtaining a substantially rectilinear trajectory of the rotation axis of the front steered wheel 7 during the suspension movement of the wheel itself, using a kinematic mechanism which has only revolute pairs and no prismatic or cylindrical pair, that is, without members provided with a reciprocal translation motion.

In other embodiments, it may be provided that the hinges that connect the members forming the Roberts four-bar linkage to each other are arranged with their axes parallel to each other and oriented at 90° with respect to the rotation axis B-B of the front steered wheel 7, i.e. orthogonal to a plane containing this rotation axis B-B of the front steered wheel 7. In other words, the hinge axes of the revolute pairs which connect the components of the four-bar linkage to each other are oriented so as to lie on vertical planes parallel to the median plane of the motor vehicle, i.e. on vertical planes extending in the direction of travel of the motor vehicle.

An embodiment of this type is illustrated in FIGS. 16 to 21. Parts corresponding to parts already described with reference to the previous figures are indicated with the same reference numerals increased by "100". FIGS. 16 to 21 show only the front steered wheel 107 with the respective suspension 117 and the rotatable arm 109, while the motor vehicle, which may be a motor vehicle similar to that indicated with 1 in FIGS. 1 to 3, is not shown.

Figure 20:
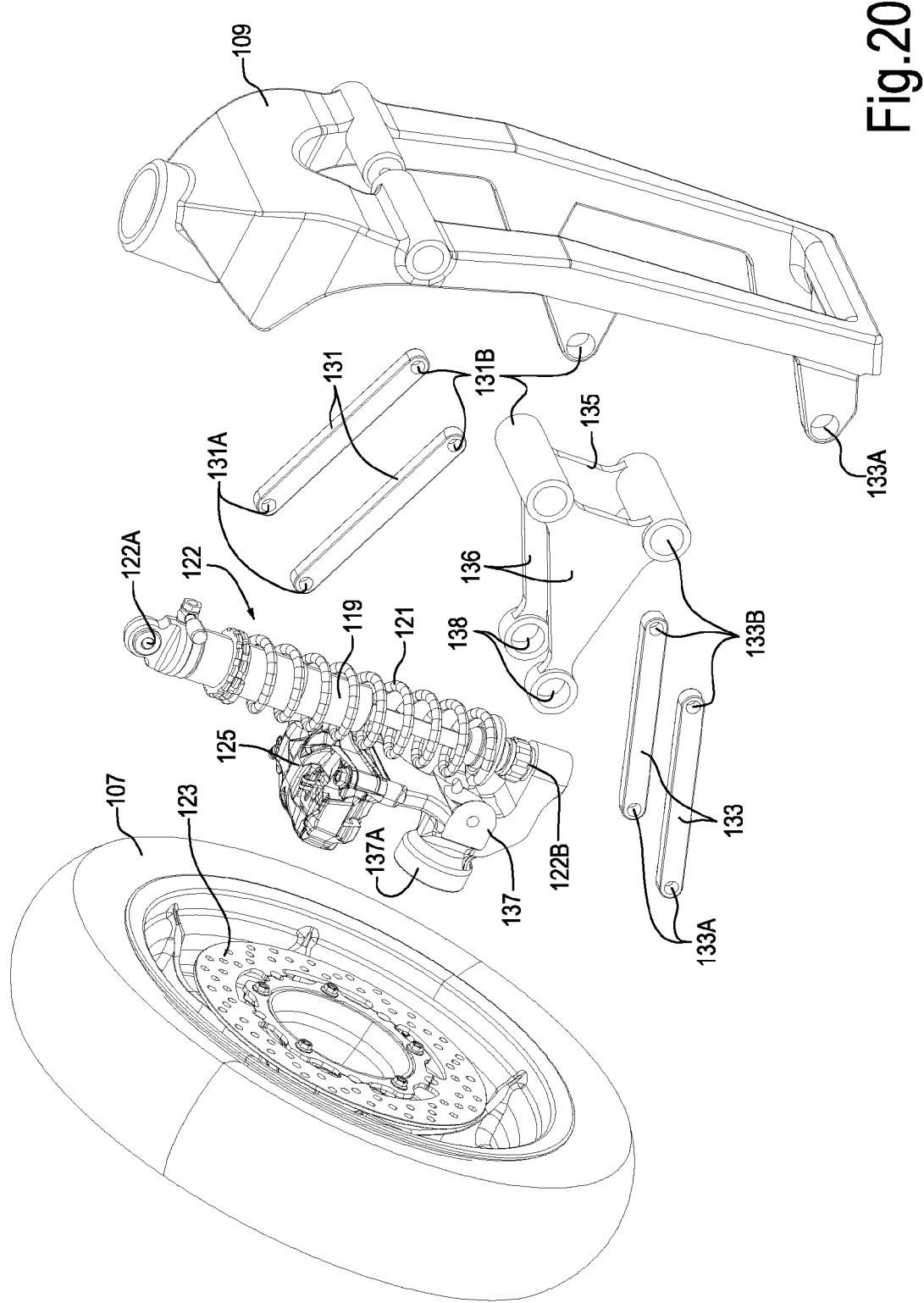
FIG. 20 shows an exploded view of the suspension of FIGS. 16 to 19.

FIGS. 16 to 19 show the assembly comprising the front steered wheel 107, the rotatable arm 109 with its steering axis A-A, as well as the suspension 117 with all the components assembled. FIG. 20 shows an exploded view of the components of the suspension 117 and of the front steered wheel 7.

More particularly, in this embodiment a suspension 117 is provided, with a Roberts four-bar linkage which comprises: a rotatable arm 109, a first crank 131, a second crank 133 and a connecting rod 135. In practice, in the illustrated embodiment, each crank 131, 133 is double. The connecting rod 135 also has a double structure, that is, formed by two parallel plates.

The second crank 131 is hinged through a first hinge 131A to the rotatable arm 109 and through a second hinge 131B to the connecting rod 135. Likewise, the crank 133 is hinged through a first hinge 133A to the rotatable arm 109 and through a second hinge 133B to the connecting rod 135. The axes of the hinges 131A, 131B, 133A, 133B are parallel to each other and oriented at 90° with respect to the rotation axis B-B of the front steered wheel 107. C-C indicates the direction of orientation of the axes of the hinges of the Roberts four-bar linkage in this embodiment. See in particular FIG. 16. In practice, the axes of the hinges of the four-bar linkage are oriented orthogonally to a plane containing the rotation axis B-B of the front steered wheel 107 and substantially parallel to the direction of the suspension movement.

The cranks 131, 133 are of substantially equal length to each other.

The connecting rod 135 has an appendix 136 which extends between the two cranks 131, 133 and ends, at the distal end, with a seat 138 (see in particular FIG. 20) where a wheel support 137 is hinged. The wheel support 137 is pivoted to the connecting rod 135, and more precisely to the appendix 136 thereof, around a hinge axis oriented in the direction C-C, i.e. an axis parallel to the axes of the hinges of the Roberts four-bar linkage. The hinge axis joining the wheel support 137 and the connecting rod 135 intersects the rotation axis B-B of the front steered wheel and is orthogonal thereto.

As can be seen in particular in FIGS. 18 and 19, the cranks 131 and 133 have the first ends, hinged by the first hinges 131A, 133A to the rotatable arm 109, on one side of the rotatable arm 109, in the example shown the side where the front steered wheel 107 is located. The second ends, hinged through the second hinges 131B, 133B to the connecting rod 135, are arranged on the opposite side of the rotatable arm 109. On this second side is also positioned the connecting rod 135, or more precisely the main body thereof, while the appendix 137 extends towards the side of the arm on which the front steered wheel 107 is located. In this way, the hinge joining the appendix 137 of the connecting rod 135 is located, with respect to the rotatable arm 109, on the same side where the first hinges 131A, 133 are located.

In the illustrated embodiment, the wheel support 137 is constrained to a lower end 122B of the shock absorber 122. In the illustrated embodiment, the constraint between the wheel support 137 and the shock absorber 122 is an interlocking. At the upper end 122A, the shock absorber is connected to the rotatable arm 109, for example with a ball joint.

The wheel support 137 forms the rotation seat 137A (FIG. 20) of the axle of the front steered wheel 107, not visible in the figures.

Figure 17:
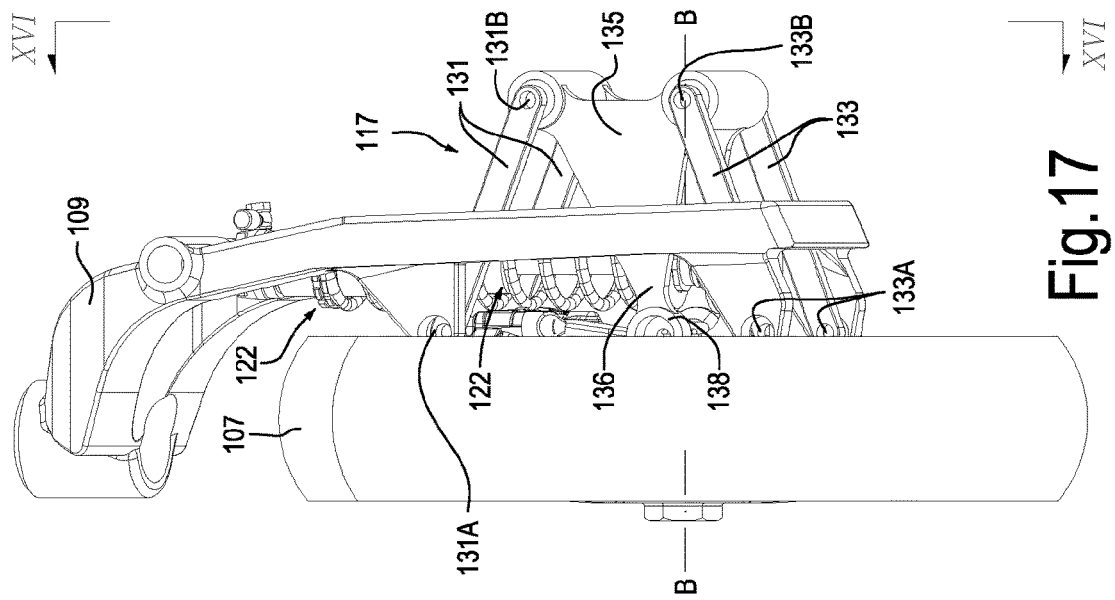
FIG. 17 shows a front view according to XVII-XVII of FIG. 16.
Figure 16:
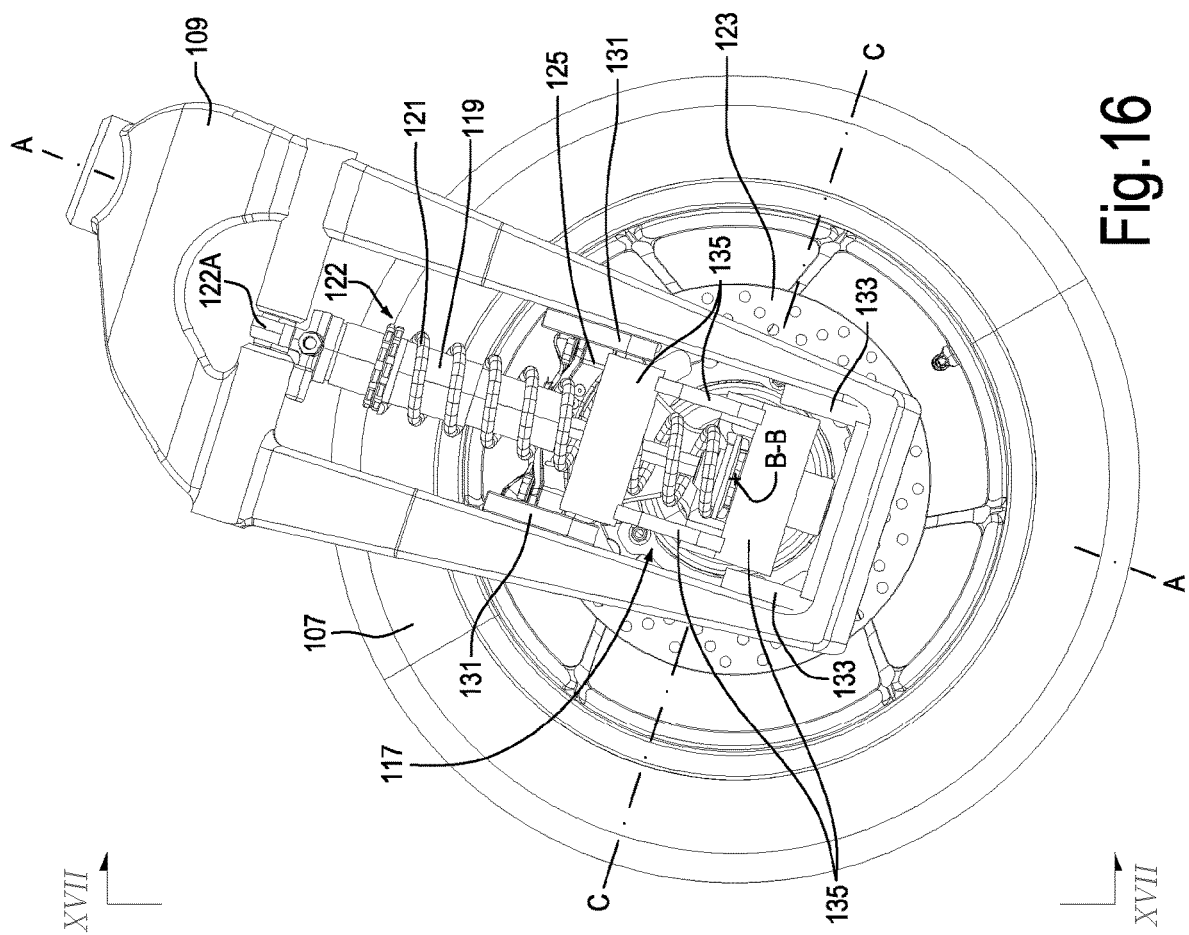
FIG. 16 shows a side view, according to the line XVI-XVI of FIG. 17, of a further embodiment of a suspension of the front steered wheel.

As visible in particular in FIGS. 17, 18 and 19, the hinges 131B and 133A are located on one side and the hinges 131A and 133B are located on the other side of the shock absorber 122.

During the suspension movement of the front steered wheel 107, the four-bar linkage of the suspension 117 deforms with pivoting movement of the cranks 131, 133 with respect to the rotatable arm 109 and consequent pivoting movement of the connecting rod 135 and its appendix 136 about the hinge axis with which it is connected to the wheel support 137. The configuration of the Roberts four-bar linkage formed by the components 109, 131, 133, 135 is also such that in the whole range of the suspension movement, the articulation between the connecting rod 135 and the wheel support 137, and therefore the rotation axis C-C, moves along an approximately rectilinear trajectory. Since the wheel support 137 is rigidly connected to the shock absorber 122, the pivoting movement of the connecting rod 135 has no effect on the camber angle of the front steered wheel 107.

Figure 21:
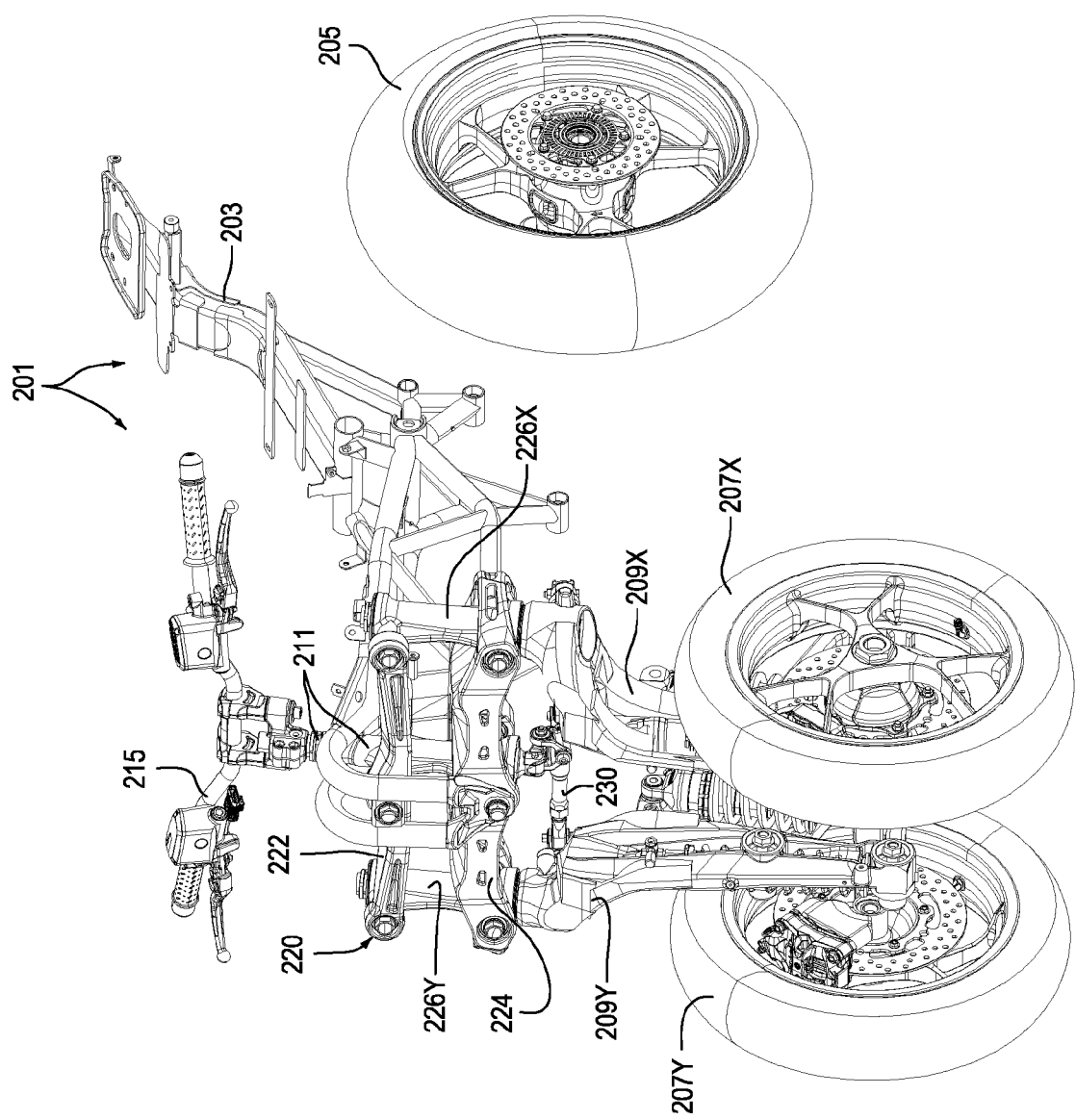
FIG. 21 shows an axonometric view of a three-wheel motor vehicle with suspensions of the two front steered wheels according to an embodiment.
Figure 22:
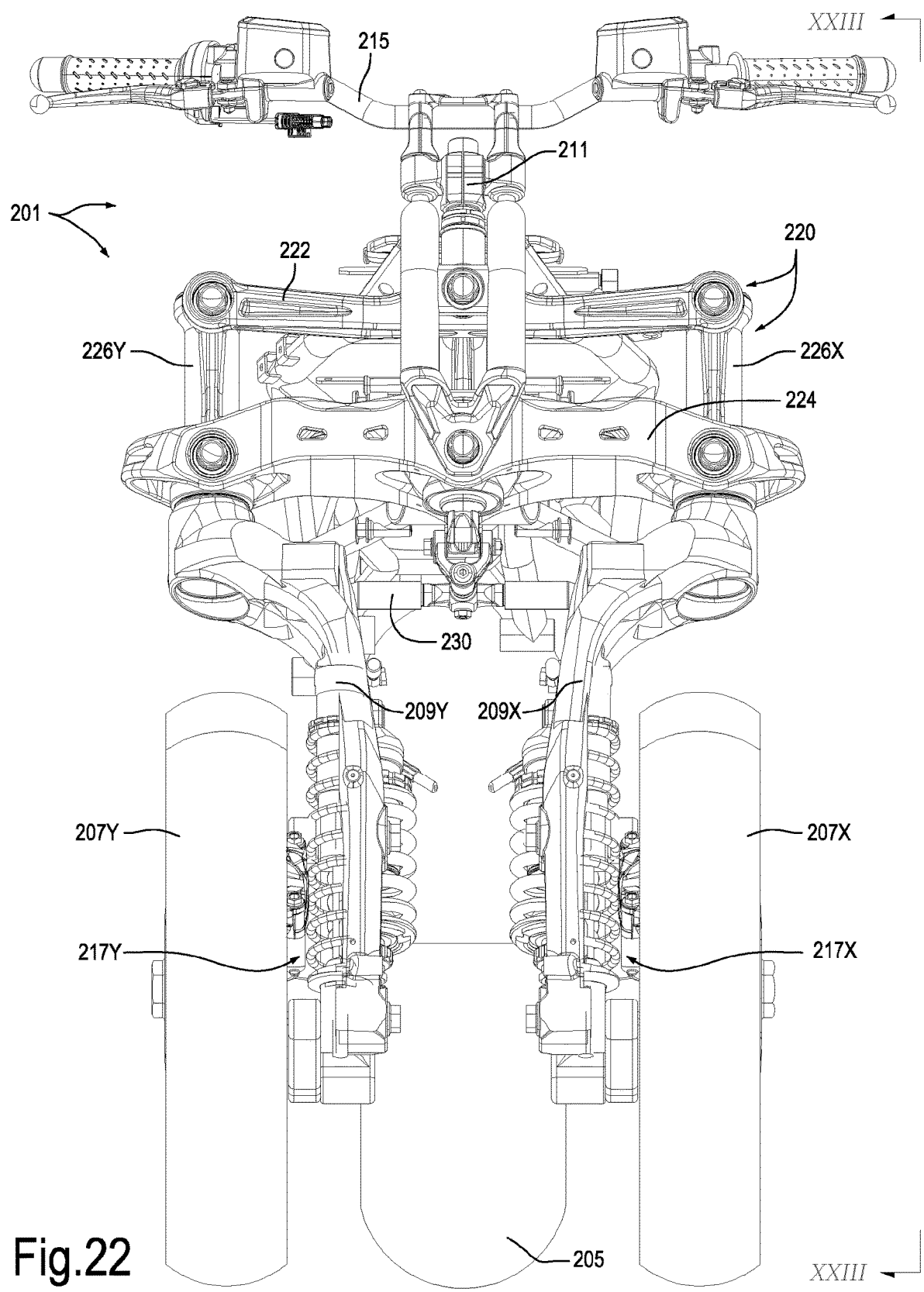
FIG. 22 shows a front view, according to the line XXII-XXII of FIG. 23, of the motor vehicle of FIG. 21.
Figure 23:
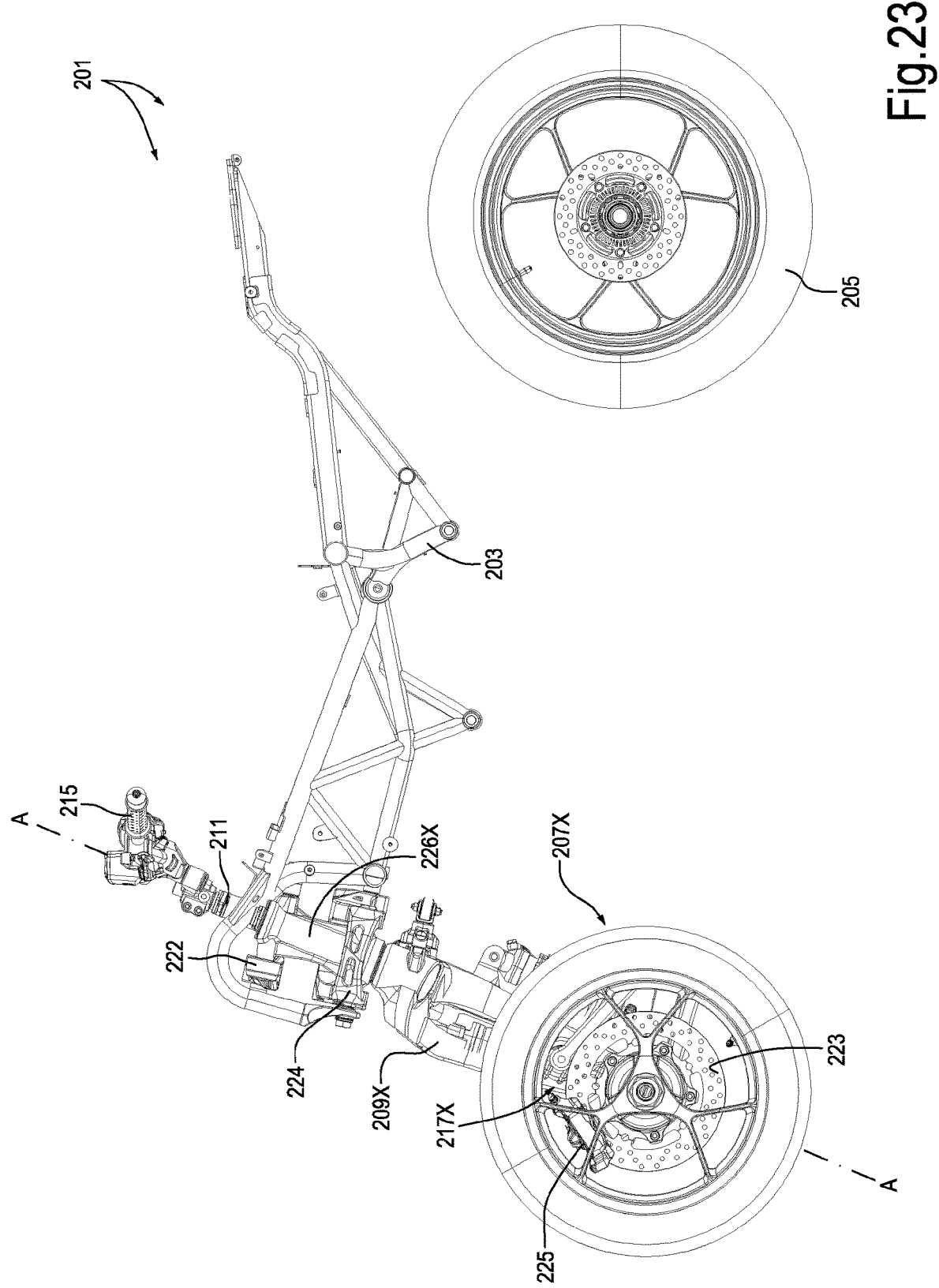
FIG. 23 shows a side view along the line XXIII-XXIII of FIG. 22.

In the embodiments described so far, reference has been made to a two-wheel motor vehicle, with a single front steered wheel 7 or 107. However, the suspensions object of the present description may also be used in tilting saddle vehicles with two front steered wheels, provided for example with one or two four-bar linkages able to ensure the rolling movement of the motor vehicle while driving. FIGS. 21 to 23 schematically illustrate a tilting saddle motor vehicle 201 with frame 203, a rear driving wheel 205 and two respectively left and right front steered wheels 207X, 207Y. The two front steered wheels 207X, 207Y are alongside in a transverse direction, i.e. right-left, of the vehicle 201.

In the embodiment schematically illustrated in FIGS. 21 to 23, 209X and 209Y indicate two rotatable arms, having the same function as the single rotatable arm 9, 109 described with reference to the previous embodiments of motor vehicles with single front steered wheel. Each rotatable arm 209X, 209Y is adapted to rotate about a steering axis A-A.

For this purpose, each rotatable arm 209X, 209Y is rotatably housed in a support or upright 226X, 226Y which is part of a rolling four-bar linkage 220. The two supports or uprights 226X, 22Y are connected to each other by crosspieces 222 and 224, respectively upper and lower. The crosspieces 222, 224 and the supports 226X, 226Y form the rolling four-bar linkage 220 and are pivoted around hinge axes parallel to each other and lying in planes oriented in the forward-rear direction of the motor vehicle 201.

Reference numeral 215 indicates a handlebar, through which a steering movement is imparted around the axes A-A to the support arms 209X, 209Y by means of a steering column 211 which acts on a steering bar 230.

The rolling four-bar linkage mechanism described so far is known per se and does not require a more detailed description.

Each front steered wheel 207X, 207Y is connected to its own rotatable arm 209X, 209Y by means of a suspension 217X, 217Y which may be made in any of the ways described with reference to FIGS. 1 to 20. In FIGS. 21-23, the suspensions 217X, 217Y are configured as in FIGS. 1 to 6B.

In all embodiments shown the front steered wheel, or each front steered wheel, is supported by a single rotatable arm 9; 109; 209X, 209Y, and this enables to provide a very compact suspension system without the use of a fork.

The invention claimed is:

1. A saddle-riding motor vehicle comprising:
   at least one rear driving wheel;
   at least a first front steered wheel;
   a rotatable arm, the front steered wheel being connected to the rotatable arm, which is provided with a rotary motion about a steering axis;
   a suspension comprising a shock absorber; and
   a wheel support connected to the rotatable arm with the interposition of the suspension, said wheel support supporting the front steered wheel and defining a rotation axis of said front steered wheel; wherein the suspension comprises a Roberts four-bar linkage.

2. The motor vehicle of claim 1, wherein the first front steered wheel is connected to a single rotatable arm.

3. The motor vehicle of claim 1, wherein the Roberts four-bar linkage comprises a first crank hinged with a first hinge to the rotatable arm and with a second hinge to a connecting rod of the Roberts four-bar linkage; a second crank hinged with a first hinge to the rotatable arm and with a second hinge to the connecting rod; and wherein the wheel support is constrained in a constraining point of an appendix of the connecting rod, which extends between the first crank and the second crank and remains between the first crank and the second crank during a suspension movement of the suspension.

4. The motor vehicle of claim 3, wherein the wheel support of the Roberts four-bar linkage is constrained to the connecting rod in such a way that the axis of rotation of the front steered wheel is parallel to axes of the first hinge and of the second hinge of the first crank and of the second crank.

5. The motor vehicle of claim 4, wherein the wheel support is rigidly connected to the appendix of the connecting rod and forms a seat for a bearing supporting the front steered wheel.

6. The motor vehicle of claim 3, wherein the first hinge and the second hinge of the first crank, and the first hinge and the second hinge of the second crank have axes parallel to the axis of rotation of the front steered wheel.

7. The motor vehicle of claim 3, wherein the first hinge and the second hinge of the first crank, and the first hinge and the second hinge of the second crank have axes substantially parallel to each other and orthogonal to a plane containing the axis of rotation of the front steered wheel.

8. The motor vehicle of claim 7, wherein the wheel support is hinged to the appendix of the connecting rod around an axis substantially parallel to the axes of the first hinge and of the second hinge of the first crank and of the second crank.

9. The motor vehicle of claim 8, wherein the wheel support supports the front steered wheel in such a position that the axis of rotation of the front steered wheel is orthogonal to the axis around which the wheel support is hinged to the connecting rod.

10. The motor vehicle of claim 1, further comprising a disc brake, with a disc integral with the front steered wheel and a caliper, wherein said caliper is rigidly connected to the wheel support.

11. The motor vehicle of claim 1, further comprising a disc brake, with a disc integral with the front steered wheel and a caliper, wherein said caliper is rigidly connected to a support member mounted idle with respect to the connecting rod and to the wheel support, and rotatable about the axis of rotation of the front steered wheel.

12. The motor vehicle of claim 3, wherein the shock absorber is connected on one side to the rotatable arm and on the other side to one of: said first crank, said second crank, and said connecting rod of the Roberts four-bar linkage.

13. The motor vehicle of claim 1, further comprising a second front steered wheel, which is connected to a second rotatable arm provided with a rotary movement about a second steering axis and is connected, with the interposition of a second suspension, to a wheel support of the second front steered wheel; wherein the second suspension comprises a shock absorber and a Roberts four-bar linkage, substantially symmetrical to the Roberts four-bar linkage of the suspension of the first front steered wheel with respect to a median plane of the motor vehicle; and wherein the first front steered wheel and the second front steered wheel are connected to the frame of the motor vehicle by means of rolling four-bar linkage hinged to the frame.

14. The motor vehicle of claim 13, wherein the first rotatable arm, to which the first front steered wheel is connected, and the second rotatable arm, to which the second front steered wheel is connected, are supported rotatably respectively right and left in uprights of the rolling four-bar linkage, the uprights being connected to each other by a first crosspiece and a second crosspiece, extending in right-left direction with respect to the median plane of the vehicle and hinged to the uprights.

15. The motor vehicle of claim 13, wherein each front steered wheel is supported by a respective single rotatable arm.

* * * * *